United States Patent
Toyomasu et al.

(10) Patent No.: US 12,447,449 B2
(45) Date of Patent: Oct. 21, 2025

(54) CHEMICAL SUPPLY APPARATUS, CLEANING SYSTEM, AND CHEMICAL SUPPLY METHOD

(71) Applicant: EBARA CORPORATION, Tokyo (JP)

(72) Inventors: Fujihiko Toyomasu, Tokyo (JP); Junji Kunisawa, Tokyo (JP); Kenichiro Saito, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 375 days.

(21) Appl. No.: 18/165,407

(22) Filed: Feb. 7, 2023

(65) Prior Publication Data

US 2023/0249145 A1     Aug. 10, 2023

(30) Foreign Application Priority Data

Feb. 9, 2022   (JP) .................. 2022-018685
Dec. 9, 2022   (JP) .................. 2022-196822

(51) Int. Cl.

| | | |
|---|---|---|
| *B01F 35/22* | (2022.01) | |
| *B01F 35/221* | (2022.01) | |
| *B08B 3/02* | (2006.01) | |
| *B01F 101/24* | (2022.01) | |

(52) U.S. Cl.
CPC ............ *B01F 35/2211* (2022.01); *B08B 3/02* (2013.01); *B01F 2101/24* (2022.01)

(58) Field of Classification Search
CPC .................................................. B01F 35/2211
See application file for complete search history.

(56) References Cited

FOREIGN PATENT DOCUMENTS

| | | |
|---|---|---|
| JP | 2016-015469 A | 1/2016 |
| JP | 2018-181883 A | 11/2018 |

*Primary Examiner* — Jason Y Ko
(74) *Attorney, Agent, or Firm* — Chrisman Gallo Tochtrop LLC

(57) ABSTRACT

The present disclosure provides a chemical supply apparatus, a cleaning system, and a chemical supply method that can supply a cleaning chemical to two nozzles and also supply the cleaning chemical at a set flow rate to one of the nozzles.

A chemical supply apparatus according to the present disclosure includes: a first cleaning chemical supply pipe; a first mixer that mixes a first chemical and water to generate a first cleaning chemical; and a first supply controller, wherein the first cleaning chemical supply pipe includes an upstream pipe forming a channel from the first mixer to a first junction, a first pipe forming a channel from the first junction to a first nozzle, and a second pipe forming a channel from the first junction to a second nozzle, and the first supply controller is configured to execute a feedback control on the basis of the flow rate of the first cleaning chemical inside the first pipe of the first cleaning chemical supply pipe so that the flow rate of the first cleaning chemical flowing through the first pipe of the first cleaning chemical supply pipe is a set flow rate.

11 Claims, 10 Drawing Sheets

CHEMICAL SUPPLY APPARATUS, CLEANING SYSTEM, AND CHEMICAL SUPPLY METHOD

CROSS-REFERENCE TO RELATED APPLICATION

This application is based upon and claims benefits of priorities from Japanese Patent Application No. 2022-018685 filed on Feb. 9, 2022, and Japanese Patent Application No. 2022-196822 filed on Dec. 9, 2022, the entire contents of which are incorporated herein by reference.

TECHNICAL FIELD

The present invention relates to a chemical supply apparatus, a cleaning system, and a chemical supply method.

BACKGROUND ART

In a semiconductor manufacturing process, a chemical mechanical polishing (CMP) apparatus is used to planarize the wafer surface. A CMP apparatus may include a polishing module for polishing the surface of a wafer and a cleaning module for cleaning the wafer. For instance, Patent Literature 1 discloses an example of a cleaning module.

The cleaning unit (cleaning module) disclosed in Patent Literature 1, as illustrated in FIG. 6 thereof, is provided with an in-line mixer 115, a cleaning chemical pipe 96, three cleaning chemical supply pipes 231, 232, and 233, a standby 221, an upper surface cleaner 222, a lower surface cleaner 223, and cleaning chemical supply valves 224, 226, and 228. In addition, the cleaning chemical pipe 96 is connected between the in-line mixer 115 and the three cleaning chemical supply pipes 231, 232, and 233. The cleaning chemical supply pipe 231 provides a fluid connection between the cleaning chemical pipe 96 and the standby 221, and is provided with the valve 224. The cleaning chemical supply pipe 232 provides a fluid connection between the cleaning chemical pipe 96 and the upper surface cleaner 222, and is provided with the valve 226. The cleaning chemical supply pipe 233 provides a fluid connection between the cleaning chemical pipe 96 and the lower surface cleaner 223, and is provided with the valve 228. With this arrangement, in the cleaning unit disclosed in Patent Literature 1, a cleaning chemical supplied from the in-line mixer 115 is distributed to flow into the three cleaning chemical supply pipes 231, 232, and 233, and is supplied to the standby 221, the upper surface cleaner 222, and the lower surface cleaner 223, respectively. Furthermore, the upper surface cleaner 222 and lower surface cleaner 223 can clean the upper and lower surfaces of a single wafer at the same time.

Patent Literature 2 discloses a chemical supply apparatus for supplying a cleaning chemical to a cleaning module. The chemical supply apparatus 100 disclosed in Patent Literature 2 includes a first in-line mixer 72, as illustrated in FIG. 2 thereof. Additionally, a first cleaning chemical generated in the first in-line mixer 72 is supplied to a chemical cleaner 220 of a cleaning module 200 through a first cleaning chemical pipe 96, and an object to be cleaned (wafer) is cleaned using the first cleaning chemical in the chemical cleaner 220.

CITATION LIST

Patent Literature

PTL 1: Japanese Patent Laid-Open No. 2016-15469
PTL 2: Japanese Patent Laid-Open No. 2018-181883

SUMMARY OF INVENTION

Technical Problem

With recent advances in semiconductor technology, it is desirable to reduce the width of traces formed on the surface of a semiconductor wafer. Forming narrower traces on the surface of a semiconductor wafer necessitates the removal of tinier particles adhering the wafer surface, and it is desirable to develop cleaning processes for removing such tiny particles. The size of the particles that can be removed by a cleaning module is thought to depend on factors such as the type, concentration, and flow rate of cleaning chemical. Consequently, an apparatus that can supply a cleaning chemical at a set concentration and flow rate to a nozzle for cleaning the surface of a semiconductor wafer may be necessary in the development of a cleaning process. Moreover, in some cases, it may be necessary to clean not only the front surface but also the back surface of a semiconductor wafer in a cleaning process. Consequently, an apparatus that can supply a cleaning chemical at a set flow rate to a nozzle for cleaning the back surface of a semiconductor wafer may also be necessary in the development of a cleaning process.

In contrast, in the cleaning unit disclosed in Patent Literature 1, the three cleaning chemical supply pipes 231, 232, and 233 are provided with the three cleaning chemical supply valves 224, 226, and 228, respectively, and by controlling the opening and closing of the three cleaning chemical supply valves 224, 226, and 228, a cleaning chemical is supplied to a wafer. However, Patent Literature 1 does not disclose how the three cleaning chemical supply valves 224, 226, and 228 are to be controlled. Consequently, the cleaning chemical may not be supplied at the intended flow rate to the nozzle for cleaning the surface of the wafer.

Moreover, Patent Literature 2 does not disclose how the first cleaning chemical supplied from the first in-line mixer 72 is to be supplied to the front and back surfaces of a wafer. For this reason, the first cleaning chemical supplied by the chemical supply apparatus according to Patent Literature 2 may not be supplied at the intended flow rate to the nozzle for cleaning the surface of the wafer.

Accordingly, one objective of the present disclosure is to provide a chemical supply apparatus, a cleaning system, and a chemical supply method that can supply a cleaning chemical to two nozzles and also supply the cleaning chemical at a set flow rate to one of the nozzles.

Solution to Problem

A chemical supply apparatus according to an embodiment is a chemical supply apparatus including: a first cleaning chemical supply pipe; a first mixer that mixes a first chemical and water to generate a first cleaning chemical; and a first supply controller, wherein the first cleaning chemical supply pipe includes an upstream pipe forming a channel from the first mixer to a first junction, a first pipe forming a channel from the first junction to a first nozzle, and a second pipe forming a channel from the first junction to a second nozzle, and the first supply controller is configured to execute a feedback control on the basis of the flow rate of the first cleaning chemical inside the first pipe of the first cleaning chemical supply pipe so that the flow rate of the first cleaning chemical flowing through the first pipe of the first cleaning chemical supply pipe is a set flow rate.

A chemical supply method according to an embodiment is a chemical supply method including: a step of mixing a first chemical and water to generate a first cleaning chemical; a step in which the first cleaning chemical flows through an upstream pipe forming a channel from a first mixer to a first junction; a step in which the first cleaning chemical flows through a first pipe forming a channel from the first junction to a first nozzle; a step in which the first cleaning chemical flows through a second pipe forming a channel from the first junction to a second nozzle; and a step in which a first supply controller executes a feedback control on the basis of the flow rate of the first cleaning chemical inside the first pipe so that the flow rate of the first cleaning chemical flowing through the first pipe is a set flow rate.

DESCRIPTION OF EMBODIMENTS

Figure 1A:
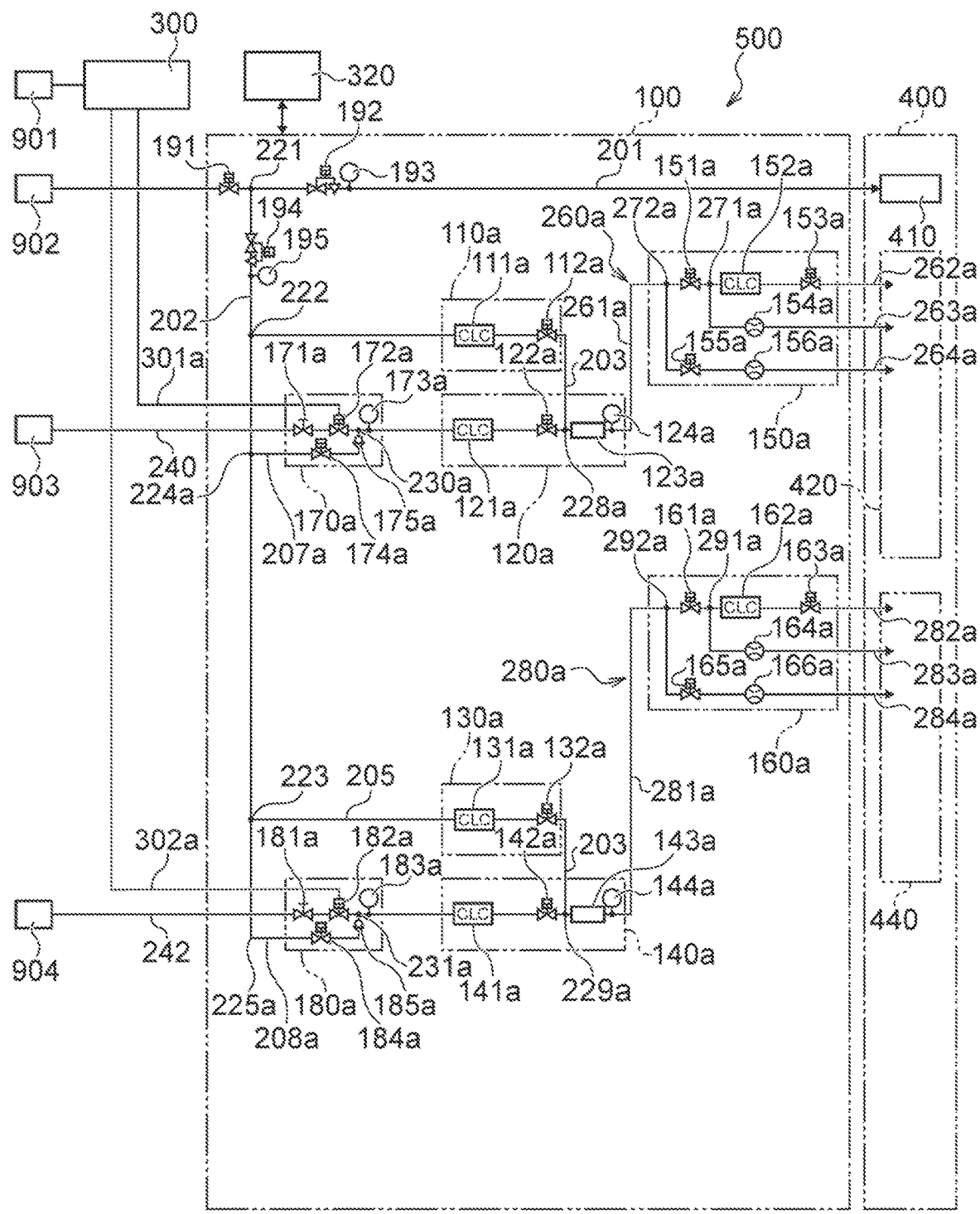
FIG. 1A is a fluid circuit diagram of a cleaning system according to an embodiment of the present disclosure.

Hereinafter, embodiments of the present invention will be described with reference to the drawings. In the drawings described hereinafter, the same or corresponding structural elements are denoted with the same signs, and duplicate description is omitted.

Figure 1B:
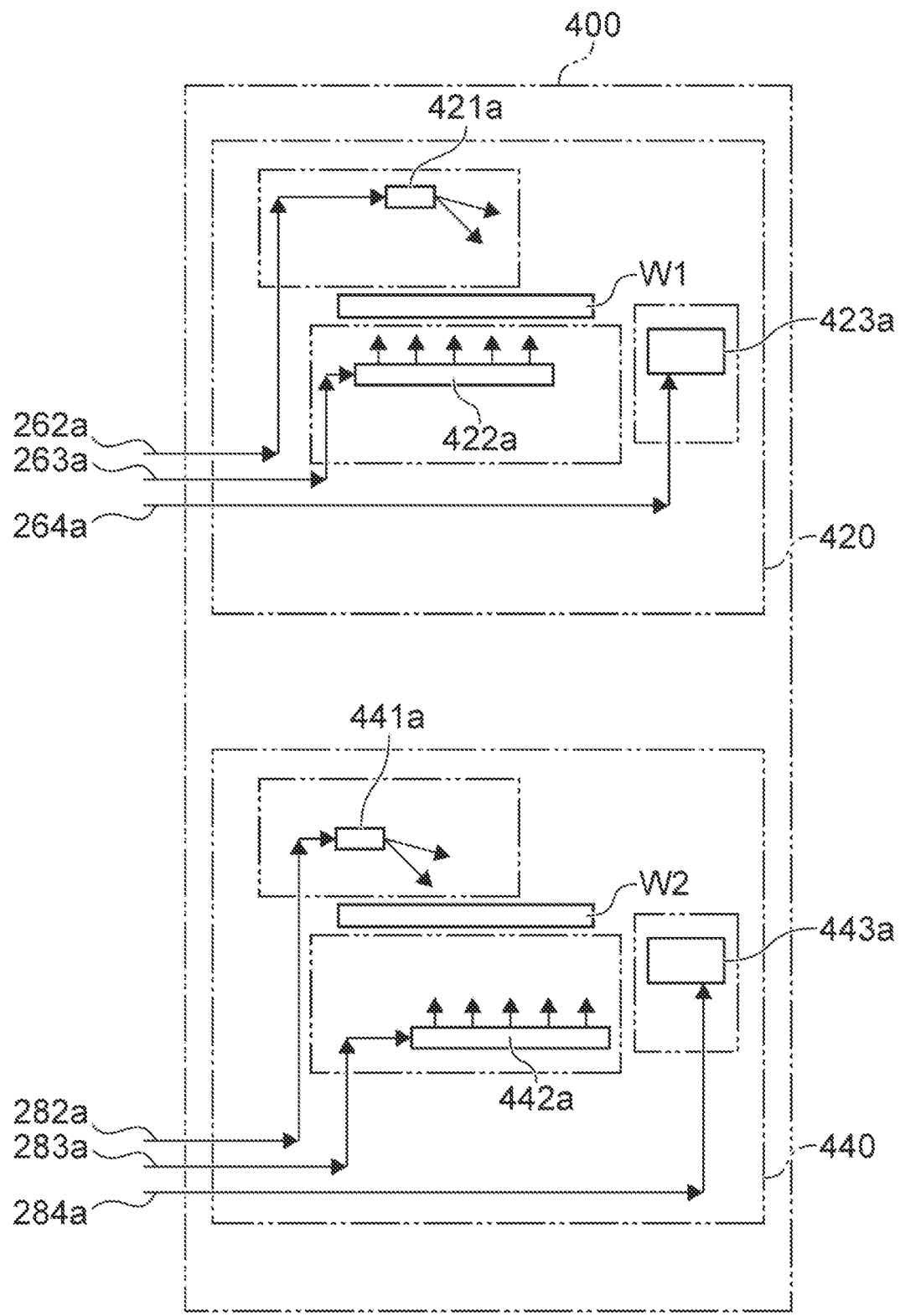
FIG. 1B is a fluid circuit diagram illustrating a wafer cleaning apparatus in FIG. 1A in detail.

FIG. 1A is a fluid circuit diagram of a cleaning system 500 according to an embodiment of the present disclosure. FIG. 1B is a fluid circuit diagram illustrating a wafer cleaning apparatus 400 in FIG. 1A in detail. Referring to FIG. 1A, the cleaning system 500 is provided with a chemical supply apparatus 100, a wafer cleaning apparatus 400, and a control apparatus 320. The supply apparatus 100 is for supplying water, a first cleaning chemical, and a second cleaning chemical to the cleaning apparatus 400. The cleaning apparatus 400 is for cleaning wafers W1 and W2 by using the water, the first cleaning chemical, and the second cleaning chemical supplied from the supply apparatus 100. A configuration of each of the supply apparatus 100 and the cleaning apparatus 400 are described hereinafter.

As illustrated in FIG. 1A, the cleaning apparatus 400 is provided with a water cleaner 410, a first cleaning tank 420, and a second cleaning tank 440. The water cleaner 410 is configured to use deionized water (DIW) to clean the wafers W1 and W2 that have been polished by a polishing apparatus. In one example, the water cleaner 410 is configured to perform ultrasonic cleaning on the wafers W1 and W2.

As illustrated in FIG. 1B, the cleaning apparatus 400 is provided with a first nozzle 421a, a second nozzle 422a, and a standby 423a. The first nozzle 421a is configured to supply the first cleaning chemical supplied from the supply apparatus 100 to a first surface of the wafer W1. The second nozzle 422a is configured to supply the first cleaning chemical supplied from the supply apparatus 100 to a second surface of the wafer W1. With this arrangement, the cleaning apparatus 400 can clean the surface on both sides of the wafer W1 with the first cleaning chemical at the same time. Note that in one example, the first surface of the wafer W1 is a pattern surface on which traces are formed, and the second surface is the back surface opposite the first surface. Also, when cleaning the wafer W1, the wafer W1 may be placed so that the first surface faces in any direction, such as vertically or horizontally, according to specifications.

The standby 423a is configured to supply the first cleaning chemical to the wafer W1 in standby before being cleaned by the first nozzle 421a and the second nozzle 422a. This arrangement prevents oxidation of the wafer W1 in standby. Note that the standby 423a may also have a nozzle for supplying the first cleaning chemical to the wafer W1 or a sponge for wafer cleaning. Also, the first cleaning tank 420 may be configured to accommodate the first nozzle 421a, the second nozzle 422a, and the standby 423a.

The cleaning apparatus 400 is also provided with a third nozzle 441a, a fourth nozzle 442a, and a standby 443a. The third nozzle 441a is configured to supply the second cleaning chemical supplied from the supply apparatus 100 to a first surface of the wafer W2. The fourth nozzle 442a is configured to supply the second cleaning chemical supplied from the supply apparatus 100 to a second surface of the wafer W2. With this arrangement, the cleaning apparatus 400 can clean the surface on both sides of the wafer W2 with the second cleaning chemical at the same time. Also, when cleaning the wafer W2, the wafer W2 may be placed so that the first surface faces in any direction, such as vertically or horizontally, according to specifications.

The standby 443a is configured to supply the second cleaning chemical to the wafer W2 in standby before being cleaned by the third nozzle 441a and the fourth nozzle 442a. This arrangement prevents oxidation of the wafer W2 in standby. Also, the second cleaning tank 440 may be configured to accommodate the third nozzle 441a, the fourth nozzle 442a, and the standby 443a.

Figure 2:
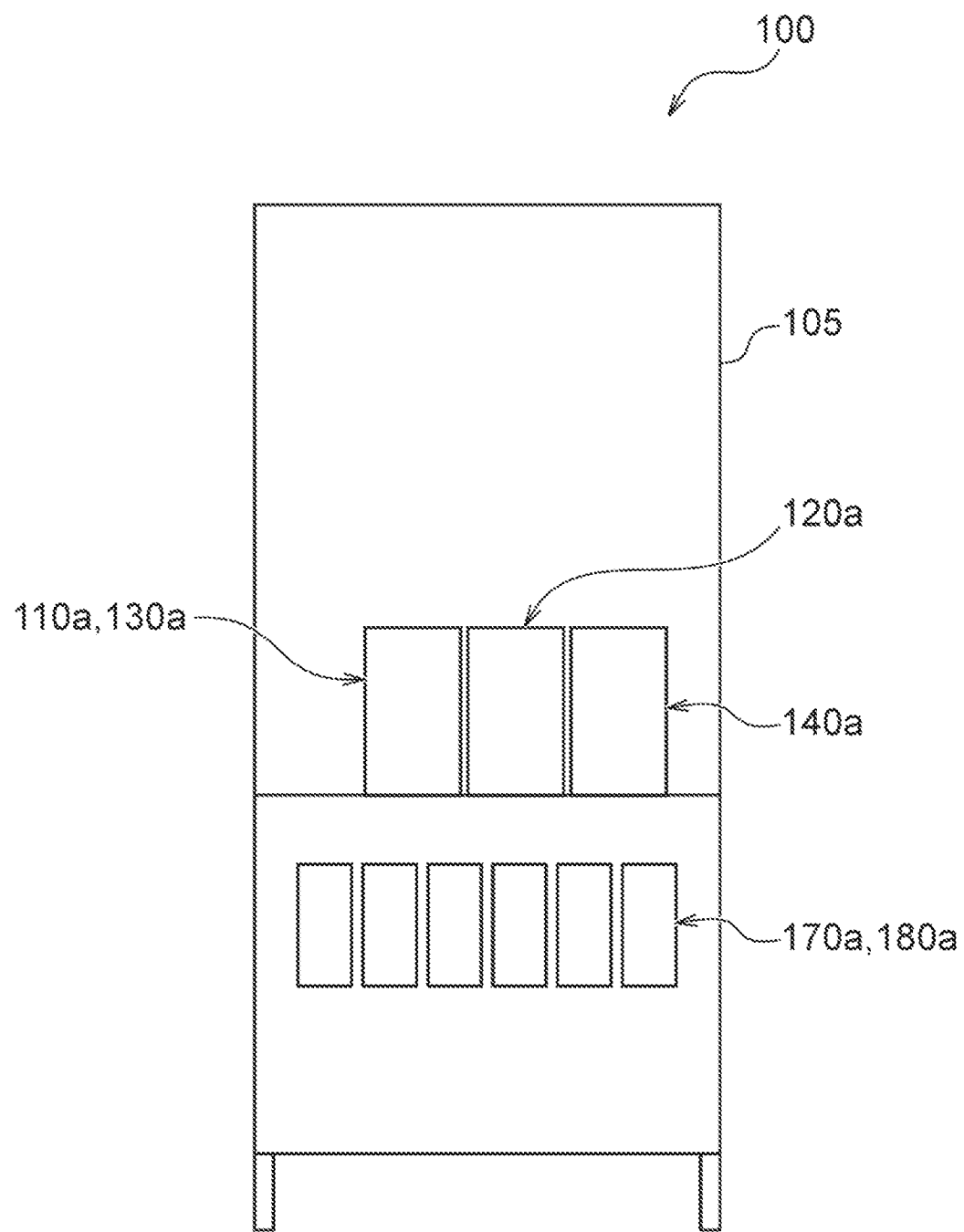
FIG. 2 is a schematic front view illustrating a chemical supply apparatus illustrated in FIG. 1A.

Next, FIG. 2 will be referenced. As illustrated in FIG. 2, the supply apparatus 100 is provided with a frame 105, two dilution water CLC boxes 110a and 130a (in FIG. 2, one of the dilution water CLC boxes 110a and 130a is omitted), a first chemical CLC box 120s, a second chemical CLC box 140a, and multiple utility boxes 170a and 180a. The two dilution water CLC boxes 110a and 130a, the first chemical CLC box 120a, the second chemical CLC box 140a, and the multiple utility boxes 170a and 180a are accommodated in the frame 105.

Referring again to FIG. 1A, the supply apparatus 100 is provided with a water pipe 201, a valve 191, a regulator 192, and a pressure gauge 193. The water pipe 201 connects a water source 902 and the water cleaner 410. In one example, the water source 902 has a function of supplying water such as DIW. With this arrangement, the supply apparatus 100 can supply water to the water cleaner 410. Also, the valve 191 is provided on the water pipe 201 farther upstream than a connecting port 221. The valve 191 is controlled by the control apparatus 320 and controls the flow rate of water flowing through the water pipe 201. The regulator 192 has a function of adjusting the feed pressure of water supplied to the water cleaner 410. The pressure gauge 193 has a function of measuring the pressure of water passing through the interior of the water pipe 201.

The supply apparatus 100 is also provided with a first mixer 123a and a first chemical pipe 240. The first chemical pipe 240 connects a first chemical source 903 and the first mixer 123a. With this arrangement, the first chemical source 903 and the first mixer 123a have a fluid connection. In one example, the first chemical source 903 has a function of supplying an alkaline first chemical. With this arrangement, the first chemical is supplied from the first chemical source 903 to the first mixer 123a.

In addition, the supply apparatus 100 is provided with dilution water pipes 202 and 203. The dilution water pipe 202 extends from the connecting port 221 provided on the water pipe 201 to a connecting port 225a. The dilution water pipe 203 extends from a connecting port 222 provided on the dilution water pipe 202 to a connecting port 228a provided on the first chemical pipe 240. With this arrangement, the water source 902 and the first mixer 123a have a fluid connection. As a result, water from the water source 902 is supplied to the first mixer 123a.

As described above, the first chemical and water (dilution water) for diluting the first chemical are supplied to the first mixer 123a. The first mixer 123a has a function of mixing the first chemical and the water to generate the first cleaning chemical, which is a dilute solution of the first chemical.

In addition, the supply apparatus 100 is provided with a flow rate controller (first dilution water controller; closed loop controller (CLC)) 111a and a valve 112a. The valve 112a is provided on the dilution water pipe 203. The valve 112a opens and closes under control by the control apparatus 320. Also, the flow rate controller 111a is provided on the dilution water pipe 203. The flow rate controller 111a is configured to execute a feedback control on the basis of the flow rate of water inside the dilution water pipe 203 so that the flow rate of water flowing through the dilution water pipe 203 is a set flow rate. In other words, the flow rate controller 111a is configured to execute a feedback control so that the flow rate of water supplied to the first mixer 123a from the water source 902 is a set flow rate.

Figure 3:
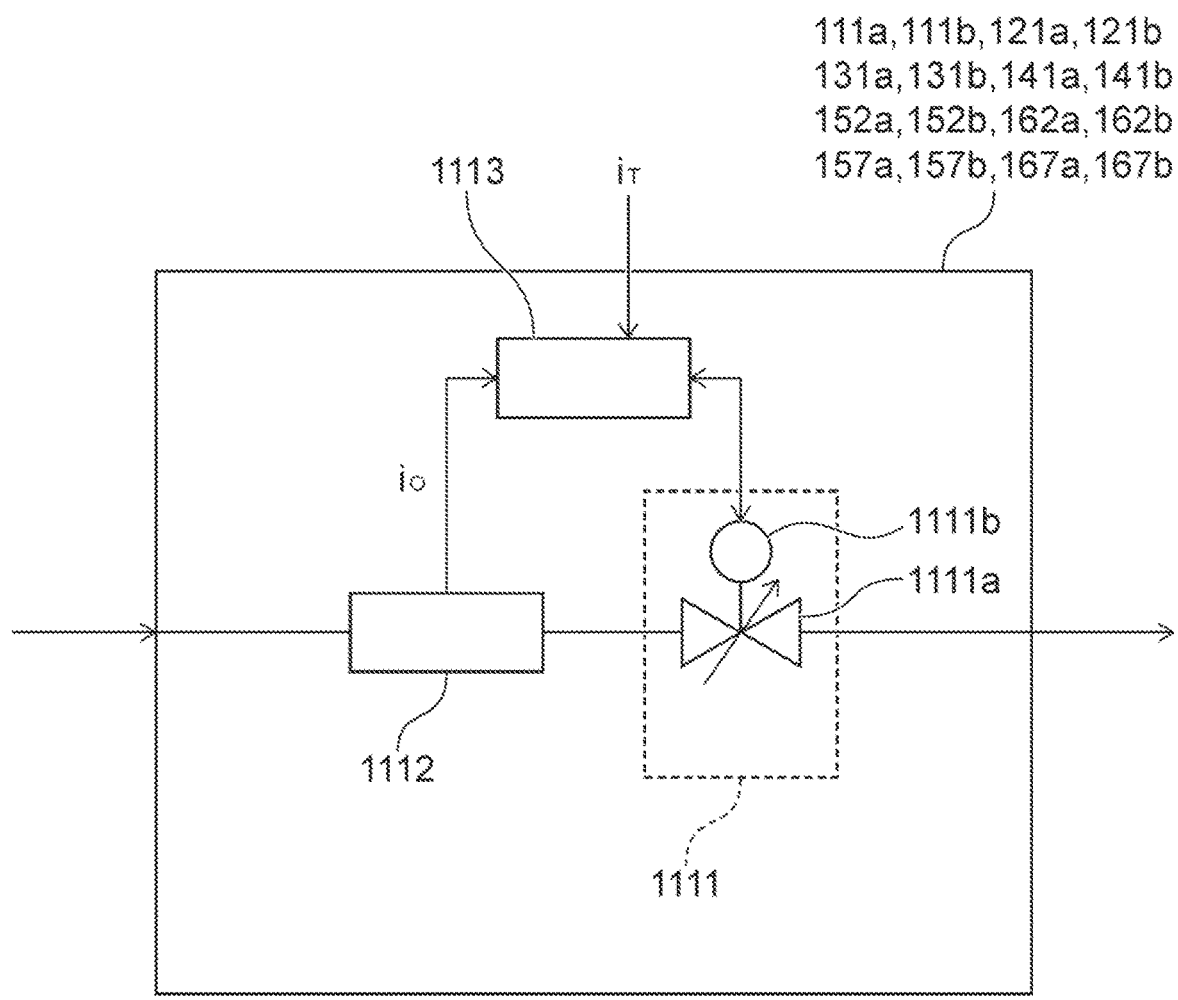
FIG. 3 is a fluid circuit diagram illustrating a configuration of a flow rate controller.

More specifically, in one example, the flow rate controller 111a has the configuration illustrated in FIG. 3. FIG. 3 is a fluid circuit diagram illustrating the configuration of the flow rate controller 111a illustrated in FIG. 1A. The flow rate controller 111a is provided with a flow meter 1112, a flow control valve 1111, and a controller 1113. In one example, the flow meter 1112 is a differential pressure flow meter (orifice flow meter). Note that in a different embodiment of the present disclosure, the flow meter 1112 may also be another flow meter such as an ultrasonic flow meter. In one example, the flow control valve 11111 is a motor valve, and the valve position of a valving element 111a is controlled by the power of a driving source 1111b provided with a motor. Note that in a different embodiment of the present disclosure, the flow control valve 1111 may be any type of valve with an adjustable valve position, and may be another type of variable flow valve (such as a solenoid valve driven by a solenoid, for example). The controller 1113 is configured to receive a set flow rate value iT of the fluid from the control apparatus 320 (see FIG. 1A) and a detected flow rate value io of the fluid from the flow meter 1112, and execute a feedback control on the flow control valve 1111 so that the detected flow rate value io matches the set flow rate value iT. Note that in one example, another flow rate controller described later has the same configuration as the flow rate controller 111a described above.

In addition, the supply apparatus 100 is provided with a flow rate controller (first chemical controller) 121a and a valve 122a (see FIG. 1A). The valve 122a is provided on the first chemical pipe 240. The valve 122a opens and closes under control by the control apparatus 320. The flow rate controller 121a is provided on the first chemical pipe 240. Additionally, the flow rate controller 121a is configured to execute a feedback control on the basis of the flow rate of the first chemical inside the first chemical pipe 240 so that the flow rate of the first chemical flowing through the first chemical pipe 240 is a set flow rate. In other words, the flow rate controller 121a is configured to execute a feedback control so that the flow rate of the first chemical supplied to the first mixer 123a from the first chemical source 903 is a set flow rate.

As described above, the supply apparatus 100 is provided with the flow rate controller 111a and the flow rate controller 121a, and therefore the first chemical and the water are supplied to the first mixer 123a at a flow rate set for each. With this arrangement, the supply apparatus 100 can generate the first cleaning chemical of prescribed concentration obtained by mixing the first chemical and the water inside the first mixer 123a, and supply the first cleaning chemical at a set flow rate.

The supply apparatus 100 is also provided with a manual valve 171a and a valve 172a. The manual valve 171a and the valve 172a are provided on the first chemical pipe 240 and accommodated in the utility box 170a. The valve 172a opens and closes under control by an air control apparatus 300 described later.

In addition, the supply apparatus 100 is provided with a flushing water pipe 207a, a valve 174a, and a check valve 175a. The flushing water pipe 207a connects a connecting port 224a provided in the dilution water pipe 202 and a connecting port 230a provided in the first chemical pipe 240. Additionally, the connecting port 230a is positioned on the first chemical pipe 240, between the flow rate controller 121a and the valve 172a. The valve 174a and the check valve 175a are provided on the flushing water pipe 207a and accommodated in the utility box 170a. The valve 174a is configured to open and close under control by the control apparatus 320. The check valve 175a is configured to cut off flow from the connecting port 230a to the connecting port 224a. Opening the valve 174a causes flushing water to flow into the first chemical pipe 240 from the connecting port 230a. With this arrangement, the supply apparatus 100 can replace the first chemical inside the first chemical pipe 240 with water, and clean the interior of the first chemical pipe 240.

The supply apparatus 100 is also provided with a first cleaning chemical supply pipe 260a. The supply pipe 260a includes an upstream pipe 261a, a first pipe 262a, a second pipe 263a, and a third pipe 264a. The upstream pipe 261a forms a channel from the first mixer 123a to a junction (first junction) 271a. The first pipe 262a forms a channel from the junction 271a to the first nozzle 421a (see FIG. 1B). The second pipe 263a forms a channel from the junction 271a to the second nozzle 422a (see FIG. 1B). The third pipe 264a forms a channel from a connecting port 272a on the upstream pipe 261a to the standby 423a (see FIG. 1B). In other words, the supply pipe 260a is configured to connect the first mixer 123a and the standby 423a through the third pipe 264a. With this arrangement, the first cleaning chemical can flow from the first mixer 123a to the first nozzle 421a, the second nozzle 422a, and the standby 423a. That is, the supply apparatus 100 can supply the first cleaning chemical to the first nozzle 421a, the second nozzle 422a, and the standby 423a. Note that in one example, the supply apparatus 100 supplies the first cleaning chemical to the first nozzle 421a at a rate of 1000-2000 cc/min, supplies the first cleaning chemical to the second nozzle 422a at a rate of 1000-2000 cc/min, and supplies the first cleaning chemical to the standby 423a at a rate of 500-1000 cc/min.

The supply apparatus 100 is also provided with a flow rate controller (first supply controller) 152a. The flow rate controller 152a is provided on the first pipe 262a. Additionally, the flow rate controller 152a is configured to execute a feedback control on the basis of the flow rate of the first cleaning chemical inside the first pipe 262a so that the flow rate of the first cleaning chemical flowing through the first pipe 262a is a set flow rate. With this arrangement, the supply apparatus 100 can supply the first cleaning chemical at the set flow rate to the first nozzle 421a.

In addition, the supply apparatus 100 is provided with valves 151a, 153a, and 155a and flow meters 154a and 156a. The valve 151a is provided on the upstream pipe 261a, between the connecting port 272a and the junction 271a. The valve 153a is provided on the first pipe 262a. The valve 155a is provided on the third pipe 264a. The valves 151a, 153a, and 155a are configured to open and close under control by the control apparatus 320. Also, the flow meter 154a is provided on the second pipe 263a and measures the flow rate of the first cleaning chemical flowing through the second pipe 263a. The flow meter 156a is provided on the third pipe 264a and measures the flow rate of the first cleaning chemical flowing through the third pipe 264a.

In addition, the supply apparatus 100 is provided with a first cleaning chemical supply box 150a. The supply box 150a accommodates the flow rate controller 152a, the valves 151a, 153a, and 155a, and the flow meters 154a and 156a.

In addition, the supply apparatus 100 is provided with an inside pressure gauge 173a and an outside pressure gauge 124a. The inside pressure gauge 173a is provided between the first chemical source 903 and the flow rate controller 121a. With this arrangement, the inside pressure gauge 173a can measure the pressure upstream of the flow rate controller 121a. Also, the outside pressure gauge 124a is provided at a position between the flow rate controller 111a and the flow rate controller 152a, and between the flow rate controller 121a and the flow rate controller 152a. With this arrangement, the outside pressure gauge 124a can measure the pressure downstream of the flow rate controller 111a and the pressure downstream of the flow rate controller 121a. Note that the dilution water pipe 203 is connected to the first chemical pipe 240 at the connecting port 228a. Accordingly, the pressure downstream of the flow rate controller 121a is equal to the pressure on the downstream side of the flow rate controller 111a.

In the supply apparatus 100, the first chemical CLC box 120a accommodates the flow rate controller 121a, the valve 122a, the first mixer 123a, and the outside pressure gauge 124a. Additionally, the dilution water CLC box 110a accommodates the flow rate controller 111a and the valve 112a. Note that in a different embodiment of the present disclosure, a single box may accommodate the flow rate controller 121a, the valve 122a, the first mixer 123a, the outside pressure gauge 124a, the flow rate controller 111a, and the valve 112a.

The supply apparatus 100 is also provided with a second mixer 143a and a second chemical pipe 242. The second chemical pipe 242 connects a second chemical source 904 and the second mixer 143a. With this arrangement, the second chemical source 904 and the second mixer 143a have a fluid connection. In one example, the second chemical source 904 has a function of supplying an acidic second chemical. With this arrangement, the second chemical is supplied from the second chemical source 904 to the second mixer 143a.

In addition, the supply apparatus 100 is provided with a dilution water pipe 205. The dilution water pipe 205 extends from a connecting port 223 provided on the dilution water pipe 202 to a connecting port 229a provided on the second chemical pipe 242. With this arrangement, the water source 902 and the second mixer 143a have a fluid connection. As a result, water from the water source 902 is supplied to the second mixer 143a.

As described above, the second chemical and water (dilution water) for diluting the second chemical are supplied to the second mixer 143a. The second mixer 143a has a function of mixing the second chemical and the water to generate the second cleaning chemical, which is a dilute solution of the second chemical.

In addition, the supply apparatus 100 is provided with a flow rate controller (second dilution water controller) 131a and a valve 132a. The valve 132a is provided on the dilution water pipe 205. The valve 132a opens and closes under control by the control apparatus 320. Also, the flow rate controller 131a is provided on the dilution water pipe 205. The flow rate controller 131a is configured to execute a feedback control on the basis of the flow rate of water inside the dilution water pipe 205 so that the flow rate of water flowing through the dilution water pipe 205 is a set flow rate. In other words, the flow rate controller 131a is configured to execute a feedback control so that the flow rate of water supplied to the second mixer 143a from the water source 902 is a set flow rate.

In addition, the supply apparatus 100 is provided with a flow rate controller (second chemical controller) 141a and a valve 142a. The valve 142a is provided on the second chemical pipe 242. The valve 142a opens and closes under control by the control apparatus 320. The flow rate controller 141a is provided on the second chemical pipe 242. Additionally, the flow rate controller 141a is configured to execute a feedback control on the basis of the flow rate of the second chemical inside the second chemical pipe 242 so that the flow rate of the second chemical flowing through the second chemical pipe 242 is a set flow rate. In other words, the flow rate controller 141a is configured to execute a feedback control so that the flow rate of the second chemical supplied to the second mixer 143a from the second chemical source 904 is a set flow rate.

As described above, the supply apparatus 100 is provided with the flow rate controller 131a and the flow rate controller 141a, and therefore the second chemical and the water are supplied to the second mixer 143a at a flow rate set for each. With this arrangement, the supply apparatus 100 can generate the second cleaning chemical of prescribed concentration obtained by mixing the second chemical and the water inside the second mixer 143a, and supply the second cleaning chemical at a set flow rate.

The supply apparatus 100 is also provided with a manual valve 181a and a valve 182a. The manual valve 181a and the valve 182a are provided on the second chemical pipe 242 and accommodated in the utility box 180a. The valve 182a opens and closes under control by an air control apparatus 300 described later.

In addition, the supply apparatus 100 is provided with a flushing water pipe 208a, a valve 184a, and a check valve 185a. The flushing water pipe 208a connects the connecting port 225a provided in the dilution water pipe 202 and a connecting port 231a provided in the second chemical pipe 242. Additionally, the connecting port 231a is positioned on the second chemical pipe 242, between the flow rate controller 141a and the valve 182a. The valve 184a and the check valve 185a are provided on the flushing water pipe 208a and accommodated in the utility box 180a. The valve 184a is configured to open and close under control by the control apparatus 320. The check valve 185a is configured to cut off flow from the connecting port 231a to the connecting port 225a. Opening the valve 184a causes flushing water to flow into the second chemical pipe 242 from the connecting port 231a. With this arrangement, the supply apparatus 100 can replace the second chemical inside the second chemical pipe 242 with water, and clean the interior of the second chemical pipe 242.

The supply apparatus 100 is also provided with a second cleaning chemical supply pipe 280a. The supply pipe 280a includes an upstream pipe 281a, a first pipe 282a, a second pipe 283a, and a third pipe 284a. The upstream pipe 281a forms a channel from the second mixer 143a to a junction (second junction) 291a. The first pipe 282a forms a channel from the junction 291a to the third nozzle 441a (see FIG. 1B). The second pipe 283a forms a channel from the junction 291a to the fourth nozzle 442a (see FIG. 1B). The third pipe 284a forms a channel from the connecting port 292a on the upstream pipe 281a to the standby 443a. In other words, the supply pipe 280a is configured to connect the second mixer 143a and the standby 443a through the third pipe 284a. With this arrangement, the second cleaning chemical can flow from the second mixer 143a to the third nozzle 441a, the fourth nozzle 442a, and the standby 443a. That is, the supply apparatus 100 can supply the second cleaning chemical to the third nozzle 441a, the fourth nozzle 442a, and the standby 443a.

The supply apparatus 100 is also provided with a flow rate controller (third supply controller) 162a. The flow rate controller 162a is provided on the first pipe 282a. Additionally, the flow rate controller 162a is configured to execute a feedback control on the basis of the flow rate of the second cleaning chemical inside the first pipe 282a so that the flow rate of the second cleaning chemical flowing through the first pipe 282a is a set flow rate. With this arrangement, the supply apparatus 100 can supply the second cleaning chemical at the set flow rate to the third nozzle 441a.

In addition, the supply apparatus 100 is provided with valves 161a, 163a, and 165a and flow meters 164a and 166a. The valve 161a is provided on the upstream pipe 281a, between the connecting port 292a and the junction 291a. The valve 163a is provided on the first pipe 282a. The valve 165a is provided on the third pipe 284a. The valves 161a, 163a, and 165a are configured to open and close under control by the control apparatus 320. Also, the flow meter 164a is provided on the second pipe 283a and measures the flow rate of the second cleaning chemical flowing through the second pipe 283a. The flow meter 166a is provided on the third pipe 284a and measures the flow rate of the second cleaning chemical flowing through the third pipe 284a.

In addition, the supply apparatus 100 is provided with a second cleaning chemical supply box 160a. The supply box 160a accommodates the flow rate controller 162a, the valves 161a, 163a, and 165a, and the flow meters 164a and 166a.

In addition, the supply apparatus 100 is provided with an inside pressure gauge 183a and an outside pressure gauge 144a. The inside pressure gauge 183a is provided between the second chemical source 904 and the flow rate controller 141a. With this arrangement, the inside pressure gauge 183a can measure the pressure upstream of the flow rate controller 141a. Also, the outside pressure gauge 144a is provided at a position between the flow rate controller 131a and the flow rate controller 152a, and between the flow rate controller 141a and the flow rate controller 162a. With this arrangement, the outside pressure gauge 144a can measure the pressure downstream of the flow rate controller 131a and the pressure downstream of the flow rate controller 141a. Note that the dilution water pipe 205 is connected to the second chemical pipe 242 at the connecting port 229a. Accordingly, the pressure downstream of the flow rate controller 131a is equal to the pressure on the downstream side of the flow rate controller 141a.

In the supply apparatus 100, the second chemical CLC box 140a accommodates the flow rate controller 141a, the valve 142a, the second mixer 143a, and the outside pressure gauge 144a. Additionally, the dilution water CLC box 130a accommodates the flow rate controller 131a and the valve 132a. Note that in a different embodiment of the present disclosure, a single box may accommodate the flow rate controller 141a, the valve 142a, the second mixer 143a, the outside pressure gauge 144a, the flow rate controller 131a, and the valve 132a.

In addition, the supply apparatus 100 is provided with an inside pressure gauge 195. The inside pressure gauge 195 is provided at a position between the water source 902 and the flow rate controller 111a, and between the water source 902 and the flow rate controller 131a. With this arrangement, the inside pressure gauge 195 can measure the pressure upstream of the flow rate controller 111a and upstream of the flow rate controller 131a. Note that the port on the upstream side of the flow rate controller 111a has a fluid connection with the port on the upstream side of the flow rate controller 131a through the dilution water pipes 202, 203, and 205. Accordingly, the pressure upstream of the flow rate controller 111a matches the pressure upstream of the flow rate controller 131a.

The supply apparatus 100 is also provided with a regulator 194. The regulator 194 is provided on the dilution water pipe 202, farther downstream than the connecting port 221 and farther upstream than the inside pressure gauge 195. The regulator 194 has a function of adjusting the feed pressure of water supplied to the flow rate controller 111a and the flow rate controller 131a.

In addition, the supply apparatus 100 is provided with an air control apparatus 300 and air pipes 301a and 302a. The air control apparatus 300 is connected to an air source 901. The air source 901 has a function of supplying a gas to the air control apparatus 300. The air pipe 301a connects the air control apparatus 300 and the valve 172a. The air pipe 302a connects the air control apparatus 300 and the valve 182a. The air control apparatus 300 controls the valve 172a, 182a by sending air to the valve 172a, 182a through the air pipes 301a, 302a, respectively.

In the supply apparatus 100, as described above, the inside pressure gauge 195 can measure the pressure upstream of the flow rate controller 111a, and the outside pressure gauge 124a can measure the pressure downstream of the flow rate controller 111a. With this arrangement, a worker can obtain the differential pressure between the inside pressure and the outside pressure of the flow rate controller 111a. Furthermore, when the flow rate controller 111a cannot control the flow rate to a desired value due to some cause, the worker may be able to ascertain the cause from the obtained differential pressure. The reason for the above is described hereinafter.

In general, when the differential pressure between the inside pressure and the outside pressure of a flow rate controller including a differential pressure flow meter is sufficiently large, the flow rate controller can control the flow rate to a desired value. However, such a flow rate controller cannot control the flow rate to a desired value if the differential pressure is insufficient. The flow rate controller likewise cannot control the flow rate to a desired value in the event of a malfunction. Consequently, when the flow controller cannot control the flow rate to a desired value, if the differential pressure between the inside pressure and the outside pressure is unknown, the worker is unable to determine whether the cause is due to a malfunction of the flow rate controller or insufficient differential pressure.

In contrast, in the supply apparatus 100, the differential pressure between the inside pressure and the outside pressure of the flow rate controller 111a is obtained. With this arrangement, when the flow rate controller 111a cannot control the flow rate to a desired value, the worker can ascertain the cause.

Furthermore, the worker can obtain the differential pressure between the inside pressure and the outside pressure for each of the flow rate controllers 121a, 131a, and 141a from the measured values from the inside pressure gauges 173a, 183a, and 195 and the outside pressure gauges 124a and 144a. With this arrangement, when the flow rate controllers 121a, 131a, and 141a cannot control the flow rate to a desired value, the worker likewise can ascertain the cause.

Also, in general, in a flow rate controller including a differential pressure flow meter, specifications such as the range of controllable flow rates and the differential pressure between the inside pressure and the outside pressure that is necessary for use are different depending on the individual controller. For this reason, the worker may replace the flow rate controller in some cases when it is desirable to change the flow rate. At this time, if the differential pressure between the inside pressure and the outside pressure is unknown, the worker may have difficulty choosing the flow rate controller to replace.

In contrast, in the supply apparatus 100, since the differential pressure between the inside pressure and the outside pressure is known for the flow rate controllers 111a, 121a, 131a, and 141a, the worker can choose a flow rate controller 111a, 121a, 131a, 141a to replace on the basis of the differential pressure.

Figure 4A:
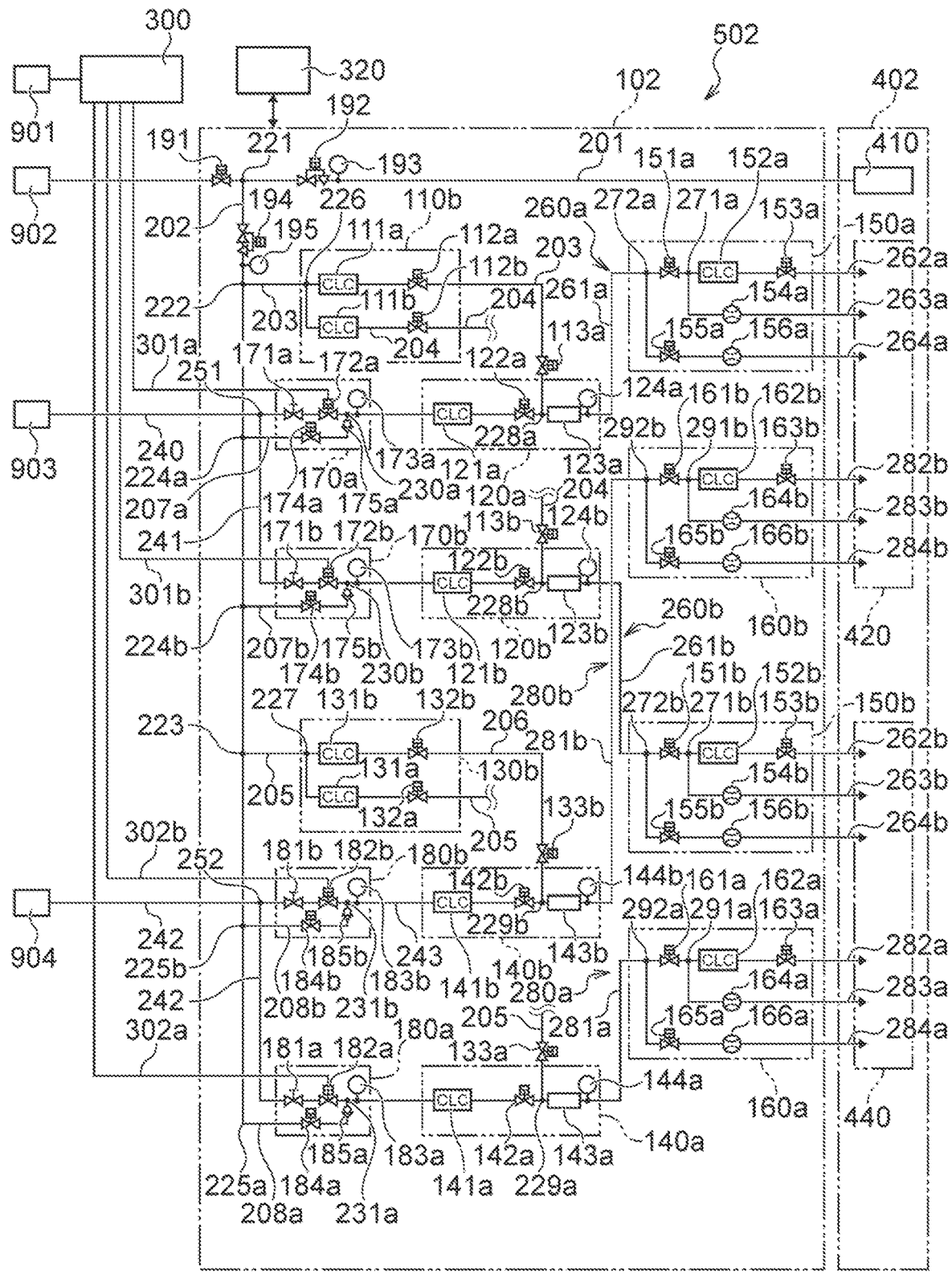
FIG. 4A is a fluid circuit diagram of a cleaning system according to another embodiment of the present disclosure.
Figure 4B:
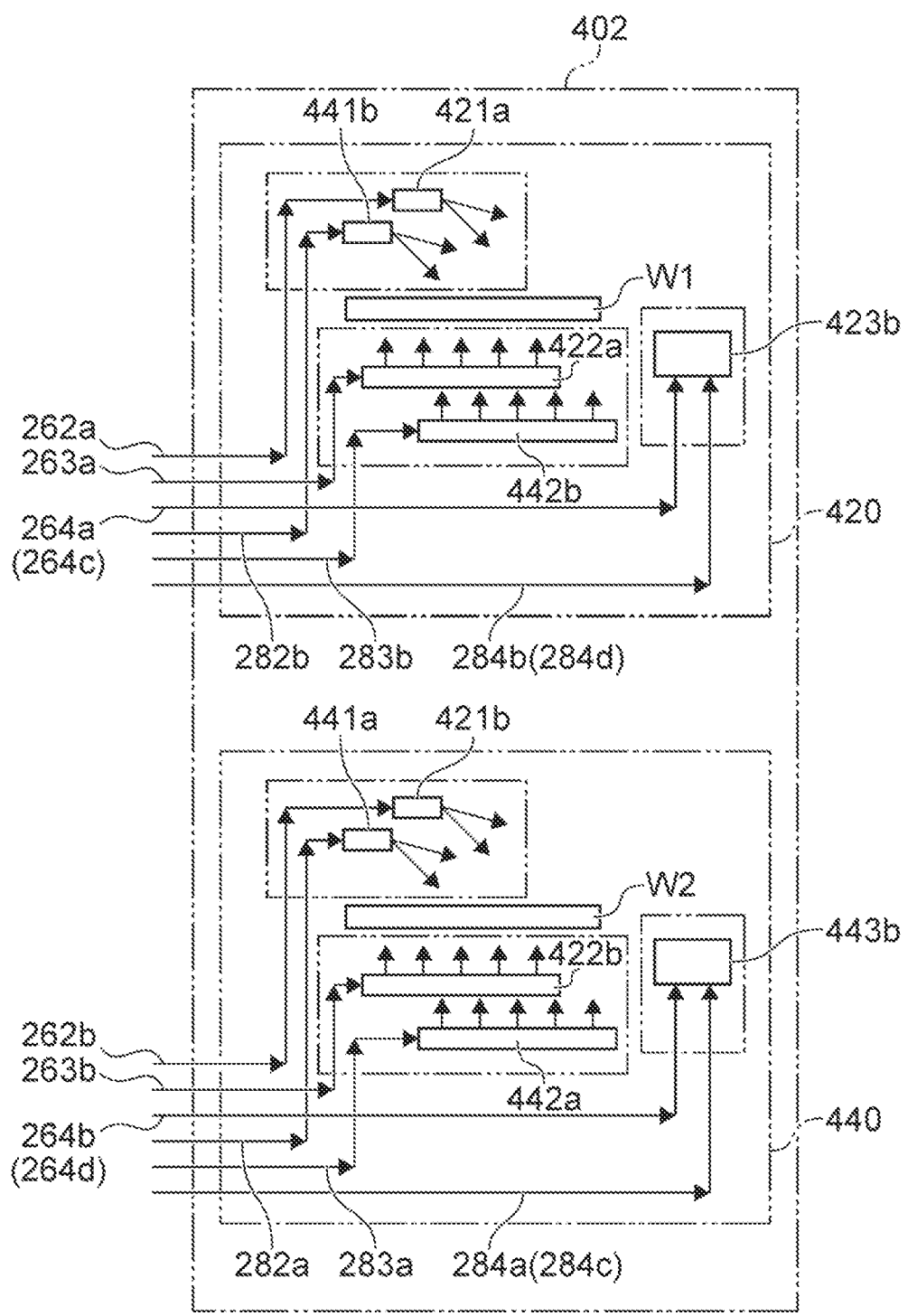
FIG. 4B is a fluid circuit diagram illustrating the wafer cleaning apparatus in FIG. 4A in detail.

Next, FIGS. 4A and 4B will be referenced. FIG. 4A is a fluid circuit diagram of a cleaning system 502 according to a different embodiment from the cleaning system 500. FIG. 4B is a fluid circuit diagram illustrating a wafer cleaning apparatus 402 in FIG. 4A in detail. Referring to FIG. 4A, the cleaning system 502 is provided with a chemical supply apparatus 102, a wafer cleaning apparatus 402, and a control apparatus 320. The supply apparatus 102 differs from the supply apparatus 100 by including, among others, two first mixers 123a and 123b and two second mixers 143a and 143b. The supply apparatus 102 also differs from the supply apparatus 100 by including, among others, two first nozzles 421a and 421b. However, the supply apparatus 102 partly shares its configuration with the supply apparatus 100. Also, the cleaning apparatus 402 partly shares its configuration with the cleaning apparatus 400. Hereinafter, the portions of the configuration of the cleaning system 502 that differ from the embodiment illustrated in FIGS. 1A and 1B will be described mainly, whereas the common portions will be denoted with the same signs in the diagrams and omitted from the description.

First, referring to FIG. 4B, the cleaning apparatus 402 is provided with a first nozzle 421b, a second nozzle 422b, and a standby 443b. The first nozzle 421b is configured to supply the first cleaning chemical supplied from the supply apparatus 102 to the first surface of the wafer W2. The second nozzle 422b is configured to supply the first cleaning chemical supplied from the supply apparatus 102 to a second surface of the wafer W2. Also, the standby 443b is configured to supply the first and second cleaning chemicals to the wafer W2. The first nozzle 421b, the second nozzle 422b, and the standby 443b are accommodated in the second cleaning tank 440.

The cleaning apparatus 402 is also provided with a third nozzle 441b, a fourth nozzle 442b, and a standby 423b. The third nozzle 441b is configured to supply the second cleaning chemical supplied from the supply apparatus 102 to the first surface of the wafer W1. The fourth nozzle 442b is configured to supply the second cleaning chemical supplied from the supply apparatus 102 to the second surface of the wafer W1. Also, the standby 423b is configured to supply the first and second cleaning chemicals to the wafer W1. The third nozzle 441b, the fourth nozzle 442b, and the standby 423b are accommodated in the first cleaning tank 420.

Referring to FIG. 4A, the supply apparatus 102 is provided with a first mixer 123b and a first chemical pipe 241. The first chemical pipe 241 connects a connecting port 251 of the first chemical pipe 240 and the first mixer 123b. With this arrangement, the first chemical source 903 and the first mixer 123b have a fluid connection. As a result, the first chemical is supplied from the first chemical source 903 to the first mixer 123b.

In addition, the supply apparatus 102 is provided with a dilution water pipe 204. The dilution water pipe 204 extends from a connecting port 226 provided on the dilution water pipe 203 to a connecting port 228b provided on the first chemical pipe 241. With this arrangement, the water source 902 and the first mixer 123b have a fluid connection. As a result, water from the water source 902 is supplied to the first mixer 123b.

As described above, the first chemical and water are supplied to the first mixer 123b. The first mixer 123b has a function of mixing the first chemical and the water to generate the first cleaning chemical.

In addition, the supply apparatus 102 is provided with a flow rate controller (first dilution water controller) 111b, a valve 112b, and a valve 113b. The valve 112b and the valve 113b are provided on the dilution water pipe 204. The valve 112b and the valve 113b open and close under control by the control apparatus 320. Also, the flow rate controller 111b is provided on the dilution water pipe 204. The flow rate controller 111b is configured to execute a feedback control on the basis of the flow rate of water inside the dilution water pipe 204 so that the flow rate of water flowing through the dilution water pipe 204 is a set flow rate. In other words, the flow rate controller 111b is configured to execute a feedback control so that the flow rate of water supplied to the first mixer 123b from the water source 902 is a set flow rate.

The supply apparatus 102 is also provided with a valve 113a. The valve 113a is provided on the dilution water pipe 203. The valve 113a opens and closes under control by the control apparatus 320.

In addition, the supply apparatus 102 is provided with a flow rate controller (first chemical controller) 121b and a valve 122b. The valve 122b is provided on the first chemical pipe 241. The valve 122b opens and closes under control by the control apparatus 320. The flow rate controller 121b is provided on the first chemical pipe 241. Additionally, the flow rate controller 121b is configured to execute a feedback control on the basis of the flow rate of the first chemical inside the first chemical pipe 241 so that the flow rate of the first chemical flowing through the first chemical pipe 241 is a set flow rate. In other words, the flow rate controller 121b is configured to execute a feedback control so that the flow rate of the first chemical supplied to the first mixer 123b from the first chemical source 903 is a set flow rate.

As described above, the supply apparatus 102 is provided with the flow rate controller 111b and the flow rate controller 121b, and therefore the first chemical and the water are supplied to the first mixer 123b at a flow rate set for each. With this arrangement, the supply apparatus 102 can generate the first cleaning chemical of prescribed concentration obtained by mixing the first chemical and the water inside the first mixer 123b, and supply the first cleaning chemical at a set flow rate.

The supply apparatus 102 is also provided with a manual valve 171b and a valve 172b. The manual valve 171b and the valve 172b are provided on the first chemical pipe 241 and accommodated in a utility box 170b. The valve 172b opens and closes under control by the air control apparatus 300.

In addition, the supply apparatus 102 is provided with a flushing water pipe 207b, a valve 174b, and a check valve 175b. The flushing water pipe 207b connects a connecting port 224b provided in the dilution water pipe 202 and a connecting port 230b provided in the first chemical pipe 241. Additionally, the connecting port 230b is positioned on the first chemical pipe 241, between the flow rate controller 121b and the valve 172b. The valve 174b and the check valve 175b are provided on the flushing water pipe 207b and accommodated in the utility box 170b. The valve 174b is configured to open and close under control by the control apparatus 320. The check valve 175b is configured to cut off flow from the connecting port 230b to the connecting port 224b. Opening the valve 174b causes flushing water to flow into the first chemical pipe 241 from the connecting port 230b. With this arrangement, the supply apparatus 102 can replace the first chemical inside the first chemical pipe 241 with water, and clean the interior of the first chemical pipe 241.

The supply apparatus 102 is also provided with a first cleaning chemical supply pipe 260b. The supply pipe 260b includes an upstream pipe 261b, a first pipe 262b, a second pipe 263b, and a third pipe 264b. The upstream pipe 261b forms a channel from the first mixer 123b to a junction (first junction) 271b. The first pipe 262b forms a channel from the junction 271b to the first nozzle 421b (see FIG. 4B). The second pipe 263b forms a channel from the junction 271b to the second nozzle 422b (see FIG. 4B). The third pipe 264b forms a channel from a connecting port 272b on the upstream pipe 261b to the standby 443b (see FIG. 4B). With this arrangement, the first cleaning chemical can flow from the first mixer 123b to the first nozzle 421b, the second nozzle 422b, and the standby 443b. That is, the supply apparatus 102 can supply the first cleaning chemical to the first nozzle 421b, the second nozzle 422b, and the standby 443b.

The supply apparatus 102 is also provided with a flow rate controller (first supply controller) 152b. The flow rate controller 152b is provided on the first pipe 262b. Additionally, the flow rate controller 152b is configured to execute a feedback control on the basis of the flow rate of the first cleaning chemical inside the first pipe 262b so that the flow rate of the first cleaning chemical flowing through the first pipe 262b is a set flow rate. With this arrangement, the supply apparatus 102 can supply the first cleaning chemical at the set flow rate to the first nozzle 421b.

In addition, the supply apparatus 102 is provided with valves 151b, 153b, and 155b, and flow meters 154b and 156b. The valve 151b is provided on the upstream pipe 261b, between the connecting port 272b and the junction 271b. The valve 153b is provided on the first pipe 262b. The valve 155b is provided on the third pipe 264b. The valves 151b, 153b, and 155b are configured to open and close under control by the control apparatus 320. Also, the flow meter 154b is provided on the second pipe 263b and measures the flow rate of the first cleaning chemical flowing through the second pipe 263b. The flow meter 156b is provided on the third pipe 264b and measures the flow rate of the first cleaning chemical flowing through the third pipe 264b.

In addition, the supply apparatus 102 is provided with a first cleaning chemical supply box 150b. The supply box 150b accommodates the flow rate controller 152b, the valves 151b, 153b, and 155b, and the flow meters 154b and 156b.

In addition, the supply apparatus 102 is provided with an inside pressure gauge 173b and an outside pressure gauge 124b. The inside pressure gauge 173b is provided between the first chemical source 903 and the flow rate controller 121b. With this arrangement, the inside pressure gauge 173b can measure the pressure upstream of the flow rate controller 121b. Also, the outside pressure gauge 124b is provided at a position between the flow rate controller 111b and the flow rate controller 152b, and between the flow rate controller 121b and the flow rate controller 152b. With this arrangement, the outside pressure gauge 124b can measure the pressure downstream of the flow rate controller 111b and the pressure downstream of the flow rate controller 121b. Note that the dilution water pipe 204 is connected to the first chemical pipe 241 at the connecting port 228b. Accordingly, the pressure downstream of the flow rate controller 121b is equal to the pressure on the downstream side of the flow rate controller 111b.

In the supply apparatus 102, a first chemical CLC box 120b accommodates the flow rate controller 121b, the valve 122b, the first mixer 123b, and the outside pressure gauge 124b. Additionally, a dilution water CLC box 110b accommodates the flow rate controllers 111a and 111b and the valves 112a and 112b.

The supply apparatus 102 is also provided with a second mixer 143b and a second chemical pipe 243. The second chemical pipe 243 connects a connecting port 252 of the second chemical pipe 242 and the second mixer 143b. With this arrangement, the second chemical source 904 and the second mixer 143b have a fluid connection. As a result, the second chemical is supplied from the second chemical source 904 to the second mixer 143b.

In addition, the supply apparatus 102 is provided with a dilution water pipe 206. The dilution water pipe 206 extends from a connecting port 227 provided on the dilution water pipe 205 to a connecting port 229b provided on the second chemical pipe 243. With this arrangement, the water source 902 and the second mixer 143b have a fluid connection. As a result, water from the water source 902 is supplied to the second mixer 143b.

As described above, the second chemical and water are supplied to the second mixer 143b. The second mixer 143b has a function of mixing the second chemical and the water to generate the second cleaning chemical.

In addition, the supply apparatus 102 is provided with a flow rate controller (second dilution water controller) 131b, a valve 132b, and a valve 133b. The valve 132b and the valve 133b are provided on the dilution water pipe 206. The valve 132b and the valve 133b open and close under control by the control apparatus 320. Also, the flow rate controller 131b is provided on the dilution water pipe 206. The flow rate controller 131b is configured to execute a feedback control on the basis of the flow rate of water inside the dilution water pipe 206 so that the flow rate of water flowing through the dilution water pipe 206 is a set flow rate. In other words, the flow rate controller 131b is configured to execute a feedback control so that the flow rate of water supplied to the second mixer 143b from the water source 902 is a set flow rate.

The supply apparatus 102 is also provided with a valve 133a. The valve 133a is provided on the dilution water pipe 205. The valve 133a opens and closes under control by the control apparatus 320.

In addition, the supply apparatus 102 is provided with a flow rate controller (second chemical controller) 141b and a valve 142b. The valve 142b is provided on the second chemical pipe 243. The valve 142b opens and closes under control by the control apparatus 320. The flow rate controller 141b is provided on the second chemical pipe 243. Additionally, the flow rate controller 141b is configured to execute a feedback control on the basis of the flow rate of the second chemical inside the second chemical pipe 243 so that the flow rate of the second chemical flowing through the second chemical pipe 243 is a set flow rate. In other words, the flow rate controller 141b is configured to execute a feedback control so that the flow rate of the second chemical supplied to the second mixer 143b from the second chemical source 904 is a set flow rate.

As described above, the supply apparatus 102 is provided with the flow rate controller 131b and the flow rate controller 141b, and therefore the second chemical and the water are supplied to the second mixer 143b at a flow rate set for each. With this arrangement, the supply apparatus 102 can generate the second cleaning chemical of prescribed concentration obtained by mixing the second chemical and the water inside the second mixer 143b, and supply the second cleaning chemical at a set flow rate.

The supply apparatus 102 is also provided with a manual valve 181b and a valve 182b. The manual valve 181b and the valve 182b are provided on the second chemical pipe 243 and accommodated in a utility box 180b. The valve 182b opens and closes under control by the air control apparatus 300.

In addition, the supply apparatus 102 is provided with a flushing water pipe 208b, a valve 184b, and a check valve 185b. The flushing water pipe 208b connects a connecting port 225b provided in the dilution water pipe 202 and a connecting port 231b provided in the second chemical pipe 243. Additionally, the connecting port 231b is positioned on the second chemical pipe 243, between the flow rate controller 141b and the valve 182b. The valve 184b and the check valve 185b are provided on the flushing water pipe 208b and accommodated in the utility box 180b. The valve 184b is configured to open and close under control by the control apparatus 320. The check valve 185b is configured to cut off flow from the connecting port 231b to the connecting port 225b. Opening the valve 184b causes flushing water to flow into the second chemical pipe 243 from the connecting port 231b. With this arrangement, the supply apparatus 100 can replace the second chemical inside the second chemical pipe 243 with water, and clean the interior of the second chemical pipe 243.

The supply apparatus 102 is also provided with a second cleaning chemical supply pipe 280b. The supply pipe 280b includes an upstream pipe 281b, a first pipe 282b, a second pipe 283b, and a third pipe 284b. The upstream pipe 281b forms a channel from the second mixer 143b to a junction (second junction) 291b. The first pipe 282b forms a channel from the junction 291b to the third nozzle 441b (see FIG. 4B). The second pipe 283b forms a channel from the junction 291b to the fourth nozzle 442b (see FIG. 48). The third pipe 284b forms a channel from a connecting port 292b on the upstream pipe 281b to the standby 423b (see FIG. 4B). In other words, the supply pipe 280b is configured to connect the second mixer 143b and the standby 423b through the third pipe 284b. With this arrangement, the first cleaning chemical can flow from the second mixer 143b to the third nozzle 441b, the fourth nozzle 442b, and the standby 423b. That is, the supply apparatus 102 can supply the second cleaning chemical to the third nozzle 441b, the fourth nozzle 442b, and the standby 423b.

The supply apparatus 102 is also provided with a flow rate controller (third supply controller) 162b. The flow rate controller 162b is provided on the first pipe 282b. Additionally, the flow rate controller 162b is configured to execute a feedback control on the basis of the flow rate of the second cleaning chemical inside the first pipe 282b so that the flow rate of the second cleaning chemical flowing through the first pipe 282b is a set flow rate. With this arrangement, the supply apparatus 102 can supply the second cleaning chemical at the set flow rate to the third nozzle 441b.

In addition, the supply apparatus 102 is provided with valves 161b, 163b, and 165b, and flow meters 164b and 166b. The valve 161b is provided on the upstream pipe 281b, between the connecting port 292b and the junction 291b. The valve 163b is provided on the first pipe 282b. The valve 165b is provided on the third pipe 284b. The valves 161b, 163b, and 165b are configured to open and close under control by the control apparatus 320. Also, the flow meter 164b is provided on the second pipe 283b and measures the flow rate of the second cleaning chemical flowing through the second pipe 283b. The flow meter 166b is provided on the third pipe 284b and measures the flow rate of the second cleaning chemical flowing through the third pipe 284b.

In addition, the supply apparatus 102 is provided with a second cleaning chemical supply box 160b. The supply box 160b accommodates the flow rate controller 162b, the valves 161b, 163b, and 165b, and the flow meters 164b and 166b.

In addition, the supply apparatus 102 is provided with an inside pressure gauge 183b and an outside pressure gauge 144b. The inside pressure gauge 183b is provided between the second chemical source 904 and the flow rate controller 141b. With this arrangement, the inside pressure gauge 183b can measure the pressure upstream of the flow rate controller 141b. Also, the outside pressure gauge 144b is provided at a position between the flow rate controller 131b and the flow rate controller 152b, and between the flow rate controller 141b and the flow rate controller 162b. With this arrangement, the outside pressure gauge 144b can measure the pressure downstream of the flow rate controller 131b and the pressure downstream of the flow rate controller 141b. Note that the dilution water pipe 206 is connected to the second chemical pipe 243 at the connecting port 229b. Accordingly, the pressure downstream of the flow rate controller 131b is equal to the pressure on the downstream side of the flow rate controller 141b.

In the supply apparatus 102, a second chemical CLC box 140b accommodates the flow rate controller 141b, the valve 142b, the second mixer 143b, and the outside pressure gauge 144b. Additionally, a dilution water CLC box 130b accommodates the flow rate controllers 131a and 131b and the valves 132a and 132b.

The inside pressure gauge 195 is provided at a position between the water source 902 and the flow rate controller 111b, and between the water source 902 and the flow rate controller 131b. With this arrangement, the inside pressure gauge 195 can measure the pressure upstream of the flow rate controller 111b and upstream of the flow rate controller 131b. Note that the port on the upstream side of the flow rate controller 111b has a fluid connection with the port on the upstream side of the flow rate controller 131b. Accordingly, the pressure upstream of the flow rate controller 111b matches the pressure upstream of the flow rate controller 131b.

In addition, the supply apparatus 102 is provided with air pipes 301b and 302b. The air pipe 301b connects the air control apparatus 300 and the valve 172b. The air pipe 302b connects the air control apparatus 300 and the valve 182b. The air control apparatus 300 controls the valve 172b, 182b by sending air to the valve 172b, 182b through the air pipe 301b, 302b, respectively.

Figure 5:
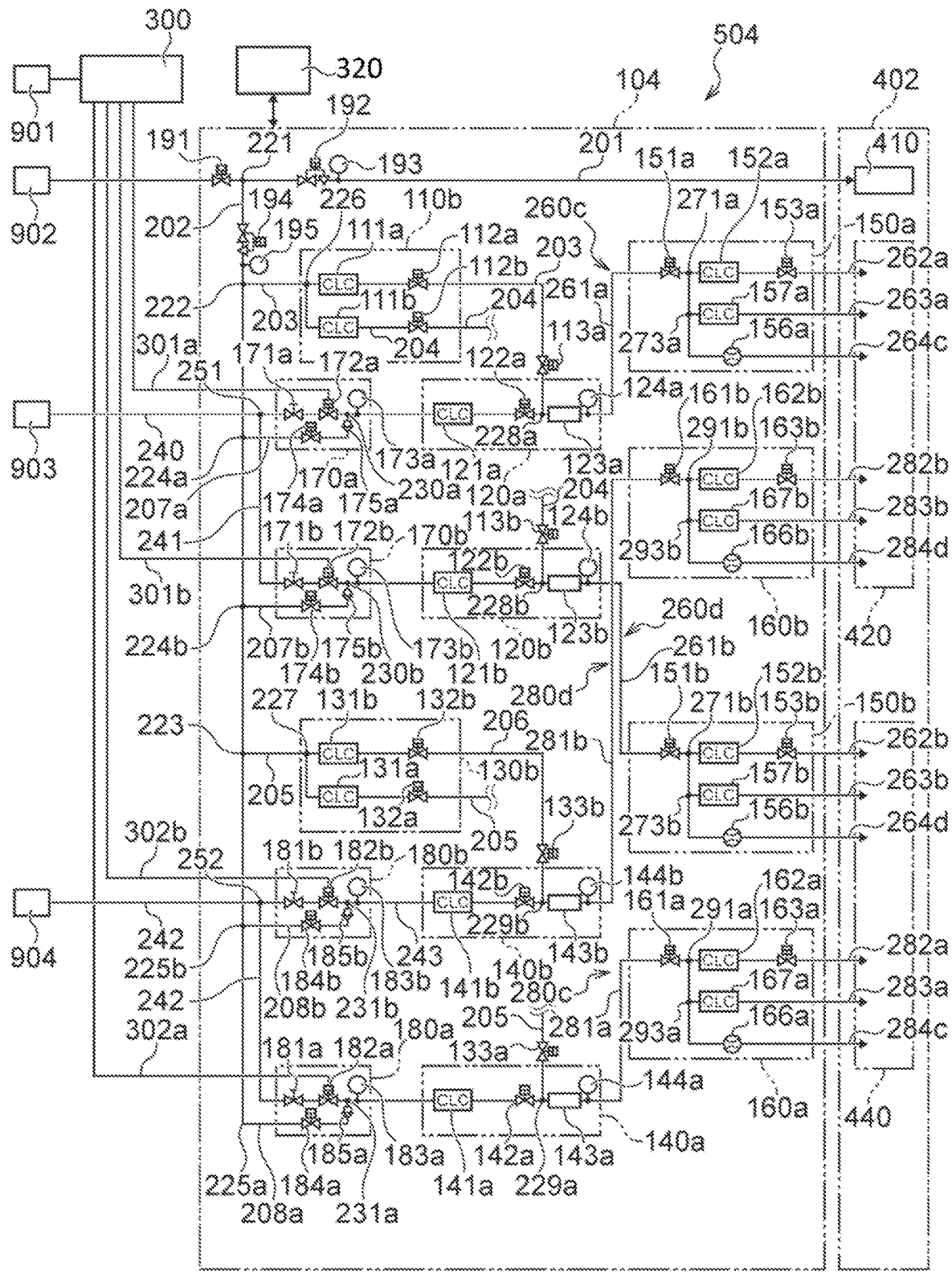
FIG. 5 is a fluid circuit diagram of a cleaning system according to yet another embodiment of the present disclosure.

FIG. 5 is a fluid circuit diagram of a cleaning system 504 according to a different embodiment from the cleaning systems 500 and 502. The configuration of the cleaning system 504 is described below with reference to FIG. 5. As illustrated in FIG. 5, the cleaning system 504 is provided with a chemical supply apparatus 104 and a wafer cleaning apparatus 402. That is, the cleaning apparatus 402 provided in the cleaning system 504 is the same as the cleaning apparatus 402 provided in the cleaning system 502 described above. Accordingly, a description of the cleaning apparatus 402 is omitted. Also, the supply apparatus 104 partly shares its configuration with the supply apparatus 102. Hereinafter, the portions of the supply apparatus 104 that differ from the supply apparatus 102 will be described mainly, whereas the common portions will be denoted with the same signs in the diagrams and omitted from the description.

Referring to FIG. 5, the supply apparatus 104 is provided with flow rate controllers (second supply controller) 157a and 157b. The flow rate controller 157a, 157b is provided on the second pipe 263a, 263b, respectively. Additionally, the flow rate controller 157a, 157b is configured to execute a feedback control on the basis of the flow rate of the first cleaning chemical inside the second pipe 263a, 263b so that the flow rate of the first cleaning chemical flowing through the second pipe 263a, 263b is a set flow rate, respectively. With this arrangement, the supply apparatus 104 can supply the first cleaning chemical at the flow rates set for the second nozzles 422a and 422b (see FIG. 4B).

In addition, the supply apparatus 104 is provided with flow rate controllers 167a and 167b. The flow rate controller 167a, 167b is provided on the second pipe 283a, 283b, respectively. Additionally, the flow rate controller 167a, 167b is configured to execute a feedback control on the basis of the flow rate of the second cleaning chemical inside the second pipe 283a, 283b so that the flow rate of the second cleaning chemical flowing through the second pipe 283a, 283b is a set flow rate, respectively. With this arrangement, the supply apparatus 104 can supply the second cleaning chemical at the flow rates set for the fourth nozzles 442a and 442b (see FIG. 4B).

In addition, a third pipe 264c, 264d of a first cleaning chemical supply pipe 260c, 260d is connected to a connecting port 273a, 273b on the second pipe 263a, 263b, respectively. The connecting port 273a, 273b is positioned between the flow rate controller 157a, 157b and the junction 271a, 271b, respectively. Also, the third pipe 264c, 264d has a fluid connection to the atmosphere through the standby 423a, 443b (see FIG. 4B), respectively. That is, the supply pipe 260c, 260d includes the third pipe 264c, 264d for establishing a fluid connection between the first mixer 123a, 123b and the atmosphere, respectively, without going through a flow rate controller for adjusting the flow rate by a feedback control. With this arrangement, the supply apparatus 104 may prevent a malfunction in which the flow rate controllers 111a, 111b, 121a, 121b, 152a, 152b, 157a, and 157b are no longer capable of controlling the flow rate appropriately. The reason for the above is described hereinafter.

In the supply apparatus 104, the flow rate controller 111a, 111b executes a feedback control so that the flow rate of water supplied to the first mixer 123a, 123b is a set flow rate, respectively. Furthermore, the flow rate controller 121a, 121b executes a feedback control so that the flow rate of the first chemical supplied to the first mixer 123a, 123b is a set flow rate, respectively. Therefore, the flow rate of the first cleaning chemical that the first mixer 123a, 123b supplies to the supply pipe 260c, 260d is the sum of the flow rate set in the flow rate controller 111a, 111b and the flow rate set in the flow rate controller 121a, 121b, respectively.

On the other hand, the case in which the supply pipe 260c, 260d does not have the third pipe 264c, 264d, respectively, shall be examined. In this case, the first cleaning chemical passes through the first pipe 262a, 262b or the second pipe 263a, 263b and is discharged to the outside of the supply pipe 260c, 260d, respectively. That is, the sum of the flow rate set in the flow rate controller 152a, 152b and the flow rate set in the flow rate controller 157a, 157b is the flow rate of the first cleaning chemical discharged to the outside of the supply pipe 260c, 260d, respectively.

At this point, if the sum of the flow rate set in the flow rate controller 111a, 111b and the flow rate set in the flow rate controller 121a, 121b differs from the sum of the flow rate set in the flow rate controller 152a, 152b and the flow rate set in the flow rate controller 157a, 157b, one of the flow rate controllers 111a, 111b, 121a, 121b, 152a, 152b, 157a, and 157b may no longer be capable of properly executing the feedback control for keeping the set flow rate. This is because the flow rate of the first cleaning chemical supplied to the supply pipe 260c, 260d must be equal to the flow rate of the first cleaning chemical discharged to the outside of the supply pipe 260c, 260d, respectively.

In contrast, in the supply apparatus 104, excess first cleaning chemical supplied to the supply pipe 260c, 260d from the first mixer 123a, 123b is discharged through a third pipe 264c, 264d, respectively. As a result, the flow rate controllers 111b, 111b, 121a, 121b, 152a, 152b, 157a, and 157b can properly execute the feedback control for keeping the set flow rate.

In addition, a third pipe 284c, 284d of a second cleaning chemical supply pipe 280c, 280d is connected to a connecting port 293a, 293b on the second pipe 283a, 283b, respectively. The connecting port 293a, 293b is positioned between the flow rate controller 167a, 167b and the junction 291a, 291b, respectively. Also, the third pipe 284c, 284d has a fluid connection to the atmosphere through the standby 443b, 423b (see FIG. 4B), respectively. That is, the supply pipe 280c, 280d includes the third pipe 284c, 284d for establishing a fluid connection between the second mixer 143a, 143b and the atmosphere, respectively, without going through a flow rate controller for adjusting the flow rate by a feedback control. With this arrangement, the supply apparatus 104 may prevent a malfunction in which the flow rate controllers 162a, 162b, 167a, and 167b are no longer capable of properly executing the feedback control for keeping the set flow rate.

Figure 6:
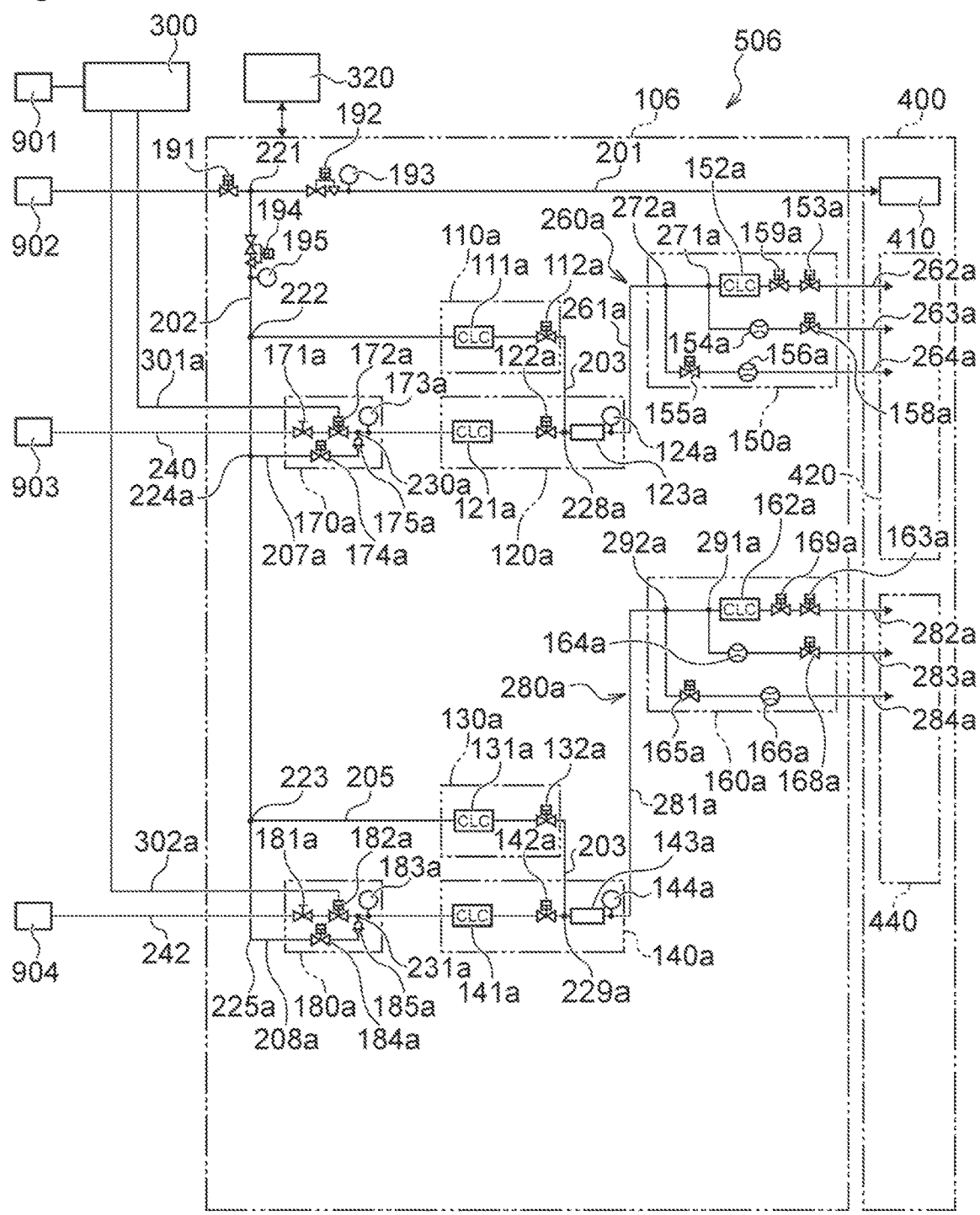
FIG. 6 is a fluid circuit diagram of a cleaning system according to yet another embodiment of the present disclosure.

FIG. 6 is a fluid circuit diagram of a cleaning system 506 according to a different embodiment from the cleaning systems 500, 502, and 504. The configuration of the cleaning system 506 is described below with reference to FIG. 6. As illustrated in FIG. 6, the cleaning system 506 is provided with a chemical supply apparatus 106 and a wafer cleaning apparatus 400. That is, the cleaning apparatus 400 provided in the cleaning system 506 is the same as the cleaning apparatus 400 provided in the cleaning system 500 described above. Accordingly, a description of the cleaning apparatus 400 is omitted. Also, the supply apparatus 106 partly shares its configuration with the supply apparatus 100. Hereinafter, the portions of the supply apparatus 106 that differ from the supply apparatus 100 will be described mainly, whereas the common portions will be denoted with the same signs in the diagrams and omitted from the description.

Referring to FIG. 6, the supply apparatus 106 is provided with valves 159a and 169a instead of the valves 151a and 161a provided in the supply apparatus 100 in FIG. 1. The valve 159a is provided on the first pipe 262a, between the flow rate controller 152a and the valve 153a. The valve 169a is provided on the first pipe 282a, between the flow rate controller 162a and the valve 163a. The valves 159a and 169a are configured to open and close under control by the control apparatus 320. More specifically, in one example, the valves 159a and 169a are on/off valves. Note that in the present disclosure, an on/off valve means a valve that can take only two configurations, namely a configuration in which the valve is fully open and a configuration in which the valve is fully closed.

Since the supply apparatus 106 has the above configuration, the valve 159a can be closed to shut off the supply of the first cleaning chemical to the first nozzle 421a through the first pipe 262a of the supply pipe 260a. Also, in the supply apparatus 106, the valve 169a can be closed to shut off the supply of the second cleaning chemical to the third nozzle 441a through the first pipe 282a of the supply pipe 280a. Note that in a different embodiment of the present disclosure, the valves 159a and 169a may be continuous control valves in which the valve position can be varied continuously, rather than on/off valves.

Also, in the supply apparatus 106, the time until the flow rate of the first cleaning chemical flowing through the first pipe 262a of the supply pipe 260a reaches the set flow rate when the valve 159a is opened may be shortened compared to the case in which a valve is positioned upstream of the flow rate controller 152a (the configuration of the supply apparatus 100 in FIG. 1). The reason for the above is described hereinafter.

In the case in which the valve 151a is upstream of the flow rate controller 152a as in the supply apparatus 100 illustrated in FIG. 1, when the valve 151a is opened, the first cleaning chemical is supplied to the flow rate controller 152a. Before the opening of the valve 151a, the pressure is high on the upstream side of the valve 151a and low on the downstream side. Accordingly, immediately after the opening of the valve 151a, the high-pressure fluid on the upstream side and the low-pressure fluid on the downstream side mix together to become a fluid of unstable pressure, and the mixed fluid flows toward the flow rate controller 152a. For this reason, in the case in which the valve 151a and the flow rate controller 152a are close, the pressure is unstable in the vicinity of the flow meter 1112 (see FIG. 3) provided in the flow rate controller 152a. The flow meter 1112 measures the flow rate from this unstable pressure, and thus the value of the flow rate measured by the flow meter 1112 is also unstable. Since the flow rate controller 152a keeps the flow rate of the first cleaning chemical flowing through the first pipe 262a to the set flow rate on the basis of this unstable value of the flow rate, the control of the flow rate by the flow rate controller 152a may be disrupted. As a result, it may take a long time for the flow rate to stabilize at the set flow rate. However, if the valve 151a and the flow rate controller 152a are sufficiently far apart, it may not take a long time for the flow rate to stabilize in some cases. This is because enough distance can be obtained so that the in-pipe flow disturbed by passing through the valve 151a stabilizes before reaching the flow rate controller 152a, and the pressure of the fluid stabilizes before reaching the flow rate controller 152a.

In contrast, in the supply apparatus 106 in FIG. 6, the valve 159a is positioned on the downstream side of the flow rate controller 152a. When the valve 169a is opened, the first cleaning chemical flows through the first pipe 262a. The pressure in the vicinity of the flow meter 1112 of the flow rate controller 152a gradually changes in accordance with this flow. For this reason, in the supply apparatus 106, the pressure in the vicinity of the flow meter 1112 (see FIG. 3) is more stable compared to the case of the supply apparatus 100 in FIG. 1. As a result, the control of the flow rate by the flow rate controller 152a is not disturbed, and the time until the flow rate stabilizes at the set flow rate may be shortened compared to the supply apparatus 100.

The supply apparatus 106 is also provided with valves 153a and 163a. The valve 153a is provided on the first pipe 262a, farther downstream than the flow rate controller 152a. The valve 163a is provided on the first pipe 282a, farther downstream than the flow rate controller 162a. In one example, the valves 153a and 163a in the supply apparatus 106 are suck-back valves. Also, the valve 153a, 163a is configured to perform a suck-back operation that sucks back liquid in the first pipe 262a, 282a farther downstream than the valve 153a, 163a when the valve 159a, 169a is closed, respectively. With this arrangement, when the valve 159a is closed, the suck-back operation of the valve 153a deters the first cleaning chemical remaining inside the first pipe 262a from flowing out from the first nozzle 421a to the outside. Likewise, when the valve 169a is closed, the suck-back operation of the valve 163a deters the second cleaning chemical remaining inside the first pipe 282a from flowing out from the third nozzle 441a to the outside.

The supply apparatus 106 is also provided with valves 158a and 168a. The valve 158a is provided on the second pipe 263a, farther downstream than the flow meter 154a. The valve 168a is provided on the second pipe 283a, farther downstream than the flow meter 164a. The valves 158a and 168a open and close under control by the control apparatus 320. More specifically, in one example, the valves 158a and 168a are on/off valves. Since the supply apparatus 106 has the above configuration, the valve 158a can be closed to shut off the supply of the first cleaning chemical to the second nozzle 422a through the second pipe 263a. Likewise, the supply apparatus 106 can close the valve 168a to shut off the supply of the second cleaning chemical to the fourth nozzle 442a through the second pipe 283a. Note that in a different embodiment of the present disclosure, the valves 158a and 168a may be continuous control valves in which the valve position can be varied continuously.

Figure 7:
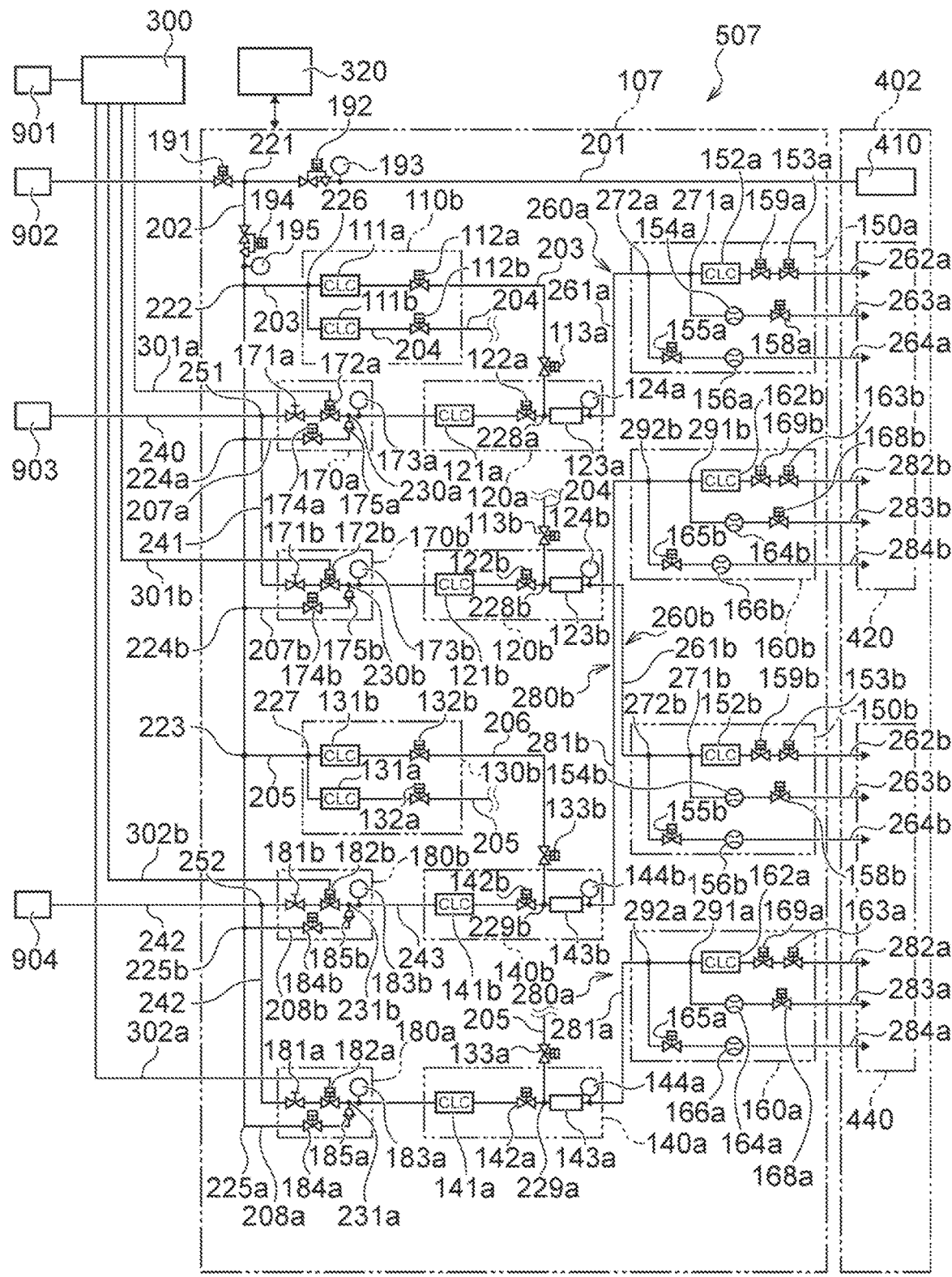
FIG. 7 is a fluid circuit diagram of a cleaning system according to yet another embodiment of the present disclosure.

FIG. 7 is a fluid circuit diagram of a cleaning system 507 according to a different embodiment from the cleaning systems 500, 502, 504, and 506. The configuration of the cleaning system 507 is described below with reference to FIG. 7. As illustrated in FIG. 7, the cleaning system 507 is provided with a chemical supply apparatus 107 and a wafer cleaning apparatus 402. That is, the cleaning apparatus 402 provided in the cleaning system 507 is the same as the cleaning apparatus 402 provided in the cleaning system 502 described above. Accordingly, a description of the cleaning apparatus 402 is omitted. Also, the supply apparatus 107 partly shares its configuration with the supply apparatus 102. Hereinafter, the portions of the supply apparatus 107 that differ from the supply apparatus 102 will be described mainly, whereas the common portions will be denoted with the same signs in the diagrams and omitted from the description.

Referring to FIG. 7, the supply apparatus 107 is provided with valves 159a and 169a instead of the valves 151a and 161a provided in the supply apparatus 102 in FIG. 4A. The valve 159a is provided on the first pipe 262a, between the flow rate controller 152a and the valve 153a. The valve 169a is provided on the first pipe 282a, between the flow rate controller 162a and the valve 163a. The valves 159a and 169a are configured to open and close under control by the control apparatus 320. More specifically, in one example, the valves 159a and 169a are on/off valves. Note that in a different embodiment of the present disclosure, the valves 159a and 169a may be continuous control valves in which the valve position can be varied continuously, rather than on/off valves.

In addition, the supply apparatus 107 is provided with valves 159b and 169b instead of the valves 151b and 161b provided in the supply apparatus 102 in FIG. 4A. The valve 159b is provided on the first pipe 262b, between the flow rate controller 152b and the valve 153b. The valve 169b is provided on the first pipe 282b, between the flow rate controller 162b and the valve 163b. The valves 159b and 169b are configured to open and close under control by the control apparatus 320. More specifically, in one example, the valves 159b and 169b are on/off valves. Note that in a different embodiment of the present disclosure, the valves 159b and 169b may be continuous control valves in which the valve position can be varied continuously, rather than on/off valves.

The supply apparatus 107 is also provided with valves 153a, 153b, 163a, and 163b. The valve 153a, 153b, 163a, 163b is provided on the first pipe 262a, 262b, 282a, 282b, farther downstream than the flow rate controller 152a, 152b, 162a, 162b, respectively. In one example, the valves 153a, 153b, 163a, and 163b in the supply apparatus 107 are suck-back valves.

The supply apparatus 107 is also provided with valves 158a, 158b, 168a, and 168b. The valve 158a, 158b, 168a, 168b is provided on the second pipe 263a, 263b, 283a, 283b, farther downstream than the flow meter 154a, 154b, 164a, 164b, respectively. The valves 158a, 158b, 168a, and 168b open and close under control by the control apparatus 320. More specifically, in one example, the valves 158a, 158b, 168a, and 168b are on/off valves. Note that in a different embodiment of the present disclosure, the valves 158a, 158b, 168a, and 168b may be continuous control valves in which the valve position can be varied continuously, rather than on/off valves.

Figure 8:
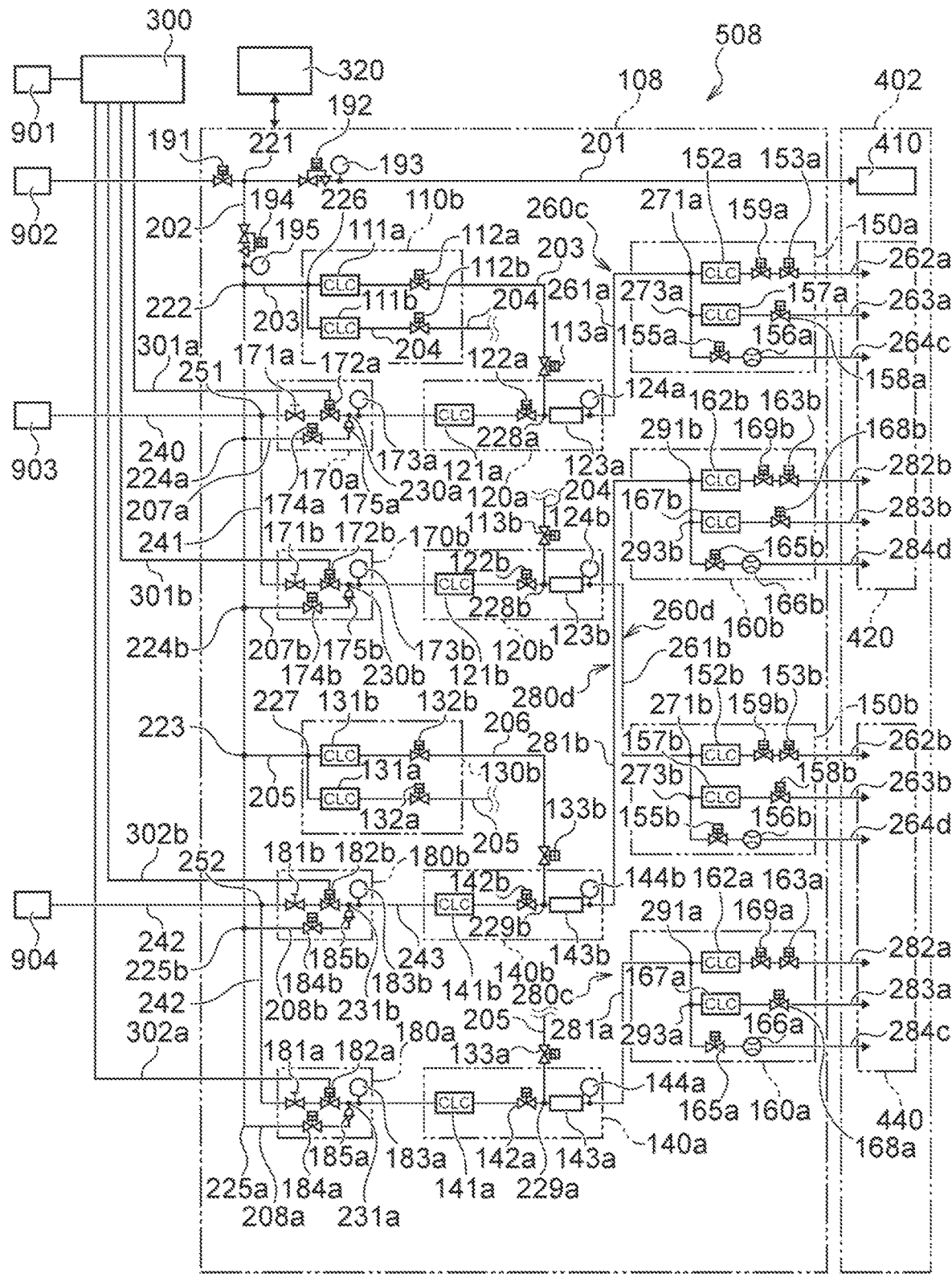
FIG. 8 is a fluid circuit diagram of a cleaning system according to yet another embodiment of the present disclosure.

FIG. 8 is a fluid circuit diagram of a cleaning system 508 according to a different embodiment from the cleaning systems 500, 502, 504, 506, and 507. The configuration of the cleaning system 508 is described below with reference to FIG. 8. As illustrated in FIG. 8, the cleaning system 508 is provided with a chemical supply apparatus 108 and a wafer cleaning apparatus 402. That is, the cleaning apparatus 402 provided in the cleaning system 508 is the same as the cleaning apparatus 402 provided in the cleaning system 504 described above. Accordingly, a description of the cleaning apparatus 402 is omitted. Also, the supply apparatus 108 partly shares its configuration with the supply apparatus 104. Hereinafter, the portions of the supply apparatus 108 that differ from the supply apparatus 104 will be described mainly, whereas the common portions will be denoted with the same signs in the diagrams and omitted from the description.

Referring to FIG. 8, the supply apparatus 108 is provided with valves 159a and 169a instead of the valves 151a and 161a provided in the supply apparatus 104 in FIG. 5. The valve 159a is provided on the first pipe 262a, between the flow rate controller 152a and the valve 153a. The valve 169a is provided on the first pipe 282a, between the flow rate controller 162a and the valve 163a. The valves 159a and 169a are configured to open and close under control by the control apparatus 320. More specifically, in one example, the valves 159a and 169a are on/off valves. Note that in a different embodiment of the present disclosure, the valves 159a and 169a may be continuous control valves in which the valve position can be varied continuously, rather than on/off valves.

In addition, the supply apparatus 108 is provided with valves 159b and 169b instead of the valves 151b and 161b provided in the supply apparatus 104 in FIG. 5. The valve 159b is provided on the first pipe 262b, between the flow rate controller 152b and the valve 153b. The valve 169b is provided on the first pipe 282b, between the flow rate controller 162b and the valve 163b. The valves 159b and 169b are configured to open and close under control by the control apparatus 320. More specifically, in one example, the valves 159b and 169b are on/off valves. Note that in a different embodiment of the present disclosure, the valves 159b and 169b may be continuous control valves in which the valve position can be varied continuously, rather than on/off valves.

The supply apparatus 108 is also provided with valves 153a, 153b, 163a, and 163b. The valve 153a, 153b, 163a, 163b is provided on the first pipe 262a, 262b, 282a, 282b, farther downstream than the flow rate controller 152a, 152b, 162a, 162b, respectively. In one example, the valves 153a, 153b, 163a, and 163b in the supply apparatus 108 are suck-back valves.

The supply apparatus 108 is also provided with valves 158a, 158b, 168a, and 168b. The valve 158a, 158b, 168a, 168b is provided on the second pipe 263a, 263b, 283a, 283b, farther downstream than the flow rate controller 157a, 157b, 167a, 167b, respectively. The valves 158a, 158b, 168a, and 168b open and close under control by the control apparatus 320. More specifically, in one example, the valves 158a, 158b, 168a, and 168b are on/off valves. Note that in a different embodiment of the present disclosure, the valves 158a, 158b, 168a, and 168b may be continuous control valves in which the valve position can be varied continuously, rather than on/off valves.

The supply apparatus 108 is also provided with valves 155a, 155b, 165a, and 165b. The valve 155a, 155b, 165a, 165b is provided on the third pipe 264c, 264d, 284c, 284d, farther upstream than the flow meter 156a, 156b, 166a, 166b, respectively. The valves 155a, 155b, 165a, and 165b open and close under control by the control apparatus 320.

More specifically, in one example, the valves 155a, 155b, 165a, and 165b are on/off valves. Note that in a different embodiment of the present disclosure, the valves 155a, 155b, 165a, and 165b may be continuous control valves in which the valve position can be varied continuously, rather than on/off valves.

[Appendix]

Some or all of the above embodiments may also be described as, but not limited to, the following appendix.

(Appendix 1)

A chemical supply apparatus according to appendix 1 is a chemical supply apparatus including: a first cleaning chemical supply pipe; a first mixer that mixes a first chemical and water to generate a first cleaning chemical; and a first supply controller, wherein the first cleaning chemical supply pipe includes an upstream pipe forming a channel from the first mixer to a first junction, a first pipe forming a channel from the first junction to a first nozzle, and a second pipe forming a channel from the first junction to a second nozzle, and the first supply controller is configured to execute a feedback control on the basis of the flow rate of the first cleaning chemical inside the first pipe of the first cleaning chemical supply pipe so that the flow rate of the first cleaning chemical flowing through the first pipe of the first cleaning chemical supply pipe is a set flow rate.

The chemical supply apparatus according to appendix 1 can supply the first cleaning chemical to two nozzles. Moreover, the chemical supply apparatus can supply the first cleaning chemical at the set flow rate to the first nozzle.

(Appendix 2)

A chemical supply apparatus according to appendix 2 is the chemical supply apparatus according to appendix 1, further including: a second supply controller configured to execute a feedback control on the basis of the flow rate of the first cleaning chemical inside the second pipe so that the flow rate of the first cleaning chemical flowing through the second pipe is a set flow rate.

The chemical supply apparatus according to appendix 2 can supply the first cleaning chemical at the set flow rate to the second nozzle.

(Appendix 3)

A chemical supply apparatus according to appendix 3 is the chemical supply apparatus according to appendix 1 or 2, wherein the first cleaning chemical supply pipe includes a third pipe for establishing a fluid connection between the first mixer and the atmosphere, without going through a flow rate controller for adjusting the flow rate by a feedback control.

In the chemical supply apparatus of appendix 3, the first cleaning chemical supplied to the first cleaning chemical supply pipe from the first mixer is discharged through the third pipe. As a result, the chemical supply apparatus can prevent a malfunction of a flow rate controller such as the first supply controller.

(Appendix 4)

A chemical supply apparatus according to appendix 4 is the chemical supply apparatus according to any one of appendices 1 to 3, including: a second cleaning chemical supply pipe; a second mixer that mixes a second chemical and water to generate a second cleaning chemical; and a third supply controller, wherein the second cleaning chemical supply pipe includes an upstream pipe forming a channel from the second mixer to a second junction, a first pipe forming a channel from the second junction to a third nozzle, and a second pipe forming a channel from the second junction to a fourth nozzle, and the third supply controller is configured to execute a feedback control on the basis of the flow rate of the second cleaning chemical inside the first pipe of the second cleaning chemical supply pipe so that the flow rate of the second cleaning chemical flowing through the first pipe of the second cleaning chemical supply pipe is a set flow rate.

The chemical supply apparatus according to appendix 4 can supply the second cleaning chemical to the third nozzle and the fourth nozzle. Moreover, the chemical supply apparatus can supply the second cleaning chemical at the set flow rate to the third nozzle.

(Appendix 5)

A chemical supply apparatus according to appendix 5 is the chemical supply apparatus according to appendix 4, including: a first chemical controller for executing a feedback control so that the flow rate of the first chemical supplied to the first mixer from a first chemical source is a set flow rate; a second chemical controller for executing a feedback control so that the flow rate of the second chemical supplied to the second mixer from a second chemical source is a set flow rate; a first dilution water controller for executing a feedback control so that the flow rate of the water supplied to the first mixer from a water source is a set flow rate; and a second dilution water controller for executing a feedback control so that the flow rate of the water supplied to the second mixer from the water source is a set flow rate.

The chemical supply apparatus according to appendix 5 can generate the first cleaning chemical of prescribed concentration obtained by mixing the first chemical and the water inside the first mixer. Likewise, the chemical supply apparatus can generate the second cleaning chemical of prescribed concentration obtained by mixing the second chemical and the water inside the second mixer.

(Appendix 6)

A chemical supply apparatus according to appendix 6 is the chemical supply apparatus according to appendix 5, wherein the first chemical controller and the first dilution water controller are included in a flow rate controller, the flow rate controller includes a differential pressure flow meter for measuring the flow rate and is configured to control the flow rate on the basis of a measured value, and the chemical supply apparatus includes: an inside pressure gauge provided between the first chemical source or the water source and the flow rate controller, and an outside pressure gauge provided between the flow rate controller and the first supply controller.

According to the chemical supply apparatus according to appendix 6, the inside pressure gauge can measure the inside pressure of the flow rate controller and the outside pressure gauge can measure the outside pressure of the flow rate controller. With this arrangement, a worker can obtain the differential pressure between the inside pressure and the outside pressure of the flow rate controller. In addition, when the flow rate controller cannot control the flow rate to a desired value, the worker may be able to ascertain the cause from the obtained differential pressure.

The worker can also choose a flow rate controller to replace on the basis of the obtained differential pressure.

(Appendix 7)

A cleaning system according to appendix 7 is a cleaning system including: the chemical supply apparatus according to any one of appendices 1 to 6; and a wafer cleaning apparatus for cleaning a wafer, wherein the wafer cleaning apparatus includes the first nozzle and the second nozzle, the first nozzle is configured to supply the first cleaning chemical to a first surface of the wafer, and the second nozzle is configured to supply the first cleaning chemical to a second surface of the wafer.

The cleaning system according to appendix 7 can supply the first cleaning chemical to the first and second surfaces of the wafer. Additionally, the cleaning system can supply the first cleaning chemical at a set flow rate to the first surface of the wafer.

(Appendix 8)

A cleaning system according to appendix 8 is the cleaning system according to appendix 7 as dependent on appendix 4, wherein the wafer cleaning apparatus includes the third nozzle and the fourth nozzle, the third nozzle is configured to supply the second cleaning chemical to the first surface of the wafer, and the fourth nozzle is configured to supply the second cleaning chemical to the second surface of the wafer.

The cleaning system according to appendix 8 can supply the second cleaning chemical to the first and second surfaces of the wafer. Additionally, the cleaning system can supply the second cleaning chemical at a set flow rate to the first surface of the wafer.

(Appendix 9)

A cleaning system according to appendix 9 is the cleaning system according to appendix 7 or 8 as dependent on appendix 3, wherein the wafer cleaning apparatus includes a standby configured to supply the first cleaning chemical to the wafer, and the first cleaning chemical supply pipe is configured to connect the first mixer and the standby through the third pipe.

The cleaning system according to appendix 9 can supply the first cleaning chemical to the wafer at the standby.

(Appendix 10)

A chemical supply method according to appendix 10 is a chemical supply method including: a step of mixing a first chemical and water to generate a first cleaning chemical; a step in which the first cleaning chemical flows through an upstream pipe forming a channel from a first mixer to a first junction; a step in which the first cleaning chemical flows through a first pipe forming a channel from the first junction to a first nozzle; a step in which the first cleaning chemical flows through a second pipe forming a channel from the first junction to a second nozzle; and a step in which a first supply controller executes a feedback control on the basis of the flow rate of the first cleaning chemical inside the first pipe so that the flow rate of the first cleaning chemical flowing through the first pipe is a set flow rate.

The chemical supply method according to appendix 10 can exhibit effects similar to the chemical supply apparatus according to appendix 1. That is, the chemical supply method can supply the first cleaning chemical to two nozzles. Moreover, the chemical supply method can supply the first cleaning chemical at the set flow rate to the first nozzle.

(Appendix 11)

A chemical supply apparatus according to appendix 11 is the chemical supply apparatus according to appendix 1 or 2, further including: a valve provided on the first cleaning chemical supply pipe, upstream of the first supply controller or downstream of the first supply controller.

In the chemical supply apparatus according to appendix 11, the valve can be closed to shut off the supply of the first cleaning chemical to the first nozzle through the first cleaning chemical supply pipe.

(Appendix 12)

A chemical supply apparatus according to appendix 12 is the chemical supply apparatus according to appendix 11, wherein the valve is provided downstream of the first supply controller.

In the chemical supply apparatus according to appendix 12, the chemical supply apparatus can shorten the time until the flow rate of the first cleaning chemical flowing through the first pipe of the first cleaning chemical supply pipe reaches the set flow rate when the valve is opened compared to the case in which the valve is positioned upstream of the first supply controller.

The foregoing describes embodiments of the present invention and associated modifications of each, but the examples described above are for facilitating the understanding of the present invention, and obviously do not limit the present invention. The present invention may be modified and improved, as appropriate, without departing from the gist thereof, and any such equivalents are to be included in the present invention. Furthermore, any combination or omission of the components described in the claims and the specification is possible insofar as at least one or some of the issues described above can be addressed, or insofar as at least one or some of the effects are exhibited.

REFERENCE SIGNS LIST 100, 102, 104, 106, 107, 108: chemical supply apparatus
111$a$, 111$b$: flow rate controller (first dilution water controller)
121$a$, 121$b$: flow rate controller (first chemical controller)
123$a$, 123$b$: first mixer
124$a$, 124$b$: outside pressure gauge
131$a$, 131$b$: flow rate controller (second dilution water controller)
141$a$, 141$b$: flow rate controller (second chemical controller)
143$a$, 143$b$: second mixer
144$a$, 144$b$: outside pressure gauge
151$a$, 151$a$: valve
152$a$, 152$b$: flow rate controller (first supply controller)
157$a$, 157$b$: flow rate controller (second supply controller)
159$a$, 159$a$: valve
161$a$, 161$a$: valve
162$a$, 162$b$: flow rate controller (third supply controller)
167$a$, 167$b$: flow rate controller
169$a$, 169$a$: valve
173$a$, 173$b$: inside pressure gauge
183$a$, 183$b$: inside pressure gauge
195: inside pressure gauge
260$a$, 260$b$: first cleaning chemical supply pipe
261$a$, 261$b$: upstream pipe
262$a$, 262$b$: first pipe
263$a$, 263$b$: second pipe
264$a$, 264$b$: third pipe
271$a$, 271$b$: junction (first junction)
280$a$, 280$b$: second cleaning chemical supply pipe
281$a$, 281$b$: upstream pipe
282$a$, 282$b$: first pipe
283$a$, 283$b$: second pipe
284$a$, 284$b$: third pipe
291$a$, 291$b$: junction (second junction)
400, 402: wafer cleaning apparatus
421$a$, 421$b$: first nozzle
422$a$, 422$b$: second nozzle
423$a$, 423$b$: standby 441a, 441b: third nozzle
442a, 442b: fourth nozzle
443a, 443b: standby
500, 502, 504, 506, 507, 508: cleaning system
902: water source
903: first chemical source
904: second chemical source

What is claimed is:

1. A chemical supply apparatus comprising:
a first cleaning chemical supply pipe;
a first mixer that mixes a first chemical and water to generate a first cleaning chemical; and
a first supply controller, wherein
the first cleaning chemical supply pipe includes
an upstream pipe forming a channel from the first mixer to a first junction,
a first pipe forming a channel from the first junction to a first nozzle, and
a second pipe forming a channel from the first junction to a second nozzle, and
the first supply controller is configured to execute a feedback control on the basis of the flow rate of the first cleaning chemical inside the first pipe of the first cleaning chemical supply pipe so that the flow rate of the first cleaning chemical flowing through the first pipe of the first cleaning chemical supply pipe is a set flow rate.

2. The chemical supply apparatus according to claim 1, further comprising:
a second supply controller configured to execute a feedback control on the basis of the flow rate of the first cleaning chemical inside the second pipe so that the flow rate of the first cleaning chemical flowing through the second pipe is a set flow rate.

3. The chemical supply apparatus according to claim 1, wherein the first cleaning chemical supply pipe includes a third pipe for establishing a fluid connection between the first mixer and the atmosphere, without going through a flow rate controller for adjusting the flow rate by a feedback control.

4. The chemical supply apparatus according to claim 3, comprising:
a second cleaning chemical supply pipe;
a second mixer that mixes a second chemical and water to generate a second cleaning chemical; and
a third supply controller, wherein
the second cleaning chemical supply pipe includes
an upstream pipe forming a channel from the second mixer to a second junction,
a first pipe forming a channel from the second junction to a third nozzle, and
a second pipe forming a channel from the second junction to a fourth nozzle, and
the third supply controller is configured to execute a feedback control on the basis of the flow rate of the second cleaning chemical inside the first pipe of the second cleaning chemical supply pipe so that the flow rate of the second cleaning chemical flowing through the first pipe of the second cleaning chemical supply pipe is a set flow rate.

5. The chemical supply apparatus according to claim 4, comprising:
a first chemical controller for executing a feedback control so that the flow rate of the first chemical supplied to the first mixer from a first chemical source is a set flow rate;
a second chemical controller for executing a feedback control so that the flow rate of the second chemical supplied to the second mixer from a second chemical source is a set flow rate;
a first dilution water controller for executing a feedback control so that the flow rate of the water supplied to the first mixer from a water source is a set flow rate; and
a second dilution water controller for executing a feedback control so that the flow rate of the water supplied to the second mixer from the water source is a set flow rate.

6. The chemical supply apparatus according to claim 5, wherein
the first chemical controller and the first dilution water controller are included in a flow rate controller,
the flow rate controller includes a differential pressure flow meter for measuring the flow rate and is configured to control the flow rate on the basis of a measured value, and
the chemical supply apparatus includes:
an inside pressure gauge provided between the first chemical source or the water source and the flow rate controller, and
an outside pressure gauge provided between the flow rate controller and the first supply controller.

7. A cleaning system comprising:
the chemical supply apparatus according to claim 4; and
a wafer cleaning apparatus for cleaning a wafer, wherein
the wafer cleaning apparatus includes the first nozzle and the second nozzle,
the first nozzle is configured to supply the first cleaning chemical to a first surface of the wafer, and
the second nozzle is configured to supply the first cleaning chemical to a second surface of the wafer.

8. The cleaning system according to claim 7, wherein
the wafer cleaning apparatus includes the third nozzle and the fourth nozzle,
the third nozzle is configured to supply the second cleaning chemical to the first surface of the wafer, and
the fourth nozzle is configured to supply the second cleaning chemical to the second surface of the wafer.

9. The cleaning system according to claim 7, wherein
the wafer cleaning apparatus includes a standby configured to supply the first cleaning chemical to the wafer, and
the first cleaning chemical supply pipe is configured to connect the first mixer and the standby through the third pipe.

10. The chemical supply apparatus according to claim 1, further comprising:
a valve provided on the first cleaning chemical supply pipe, upstream of the first supply controller or downstream of the first supply controller.

11. The chemical supply apparatus according to claim 10, wherein the valve is provided downstream of the first supply controller.

* * * * *